US012602761B2

(12) United States Patent (10) Patent No.: US 12,602,761 B2
Katsuyama (45) Date of Patent: Apr. 14, 2026

(54) IMAGE ANALYSIS APPARATUS, IMAGE ANALYSIS METHOD, AND PROGRAM

(71) Applicant: FUJIFILM Corporation, Tokyo (JP)

(72) Inventor: Kimito Katsuyama, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 112 days.

(21) Appl. No.: 18/344,823

(22) Filed: Jun. 29, 2023

(65) Prior Publication Data

US 2023/0342907 A1 Oct. 26, 2023

Related U.S. Application Data

(63) Continuation of application No. PCT/JP2021/048467, filed on Dec. 27, 2021.

(30) Foreign Application Priority Data

Jan. 14, 2021 (JP) ................................. 2021-004419

(51) Int. Cl.
G06T 7/00 (2017.01)
(52) U.S. Cl.
CPC .. G06T 7/0004 (2013.01); *G06T 2207/10048* (2013.01)
(58) Field of Classification Search
None
See application file for complete search history.

(56) References Cited

U.S. PATENT DOCUMENTS 5,719,395 A 2/1998 Lesniak
7,208,733 B2 4/2007 Mian et al.

7,994,480 B2 8/2011 Johnson et al.
8,466,422 B2 6/2013 Johnson et al.
11,650,112 B1 5/2023 Qing et al.
2002/0031265 A1* 3/2002 Higaki ...................... G06T 7/12
382/199

(Continued)

FOREIGN PATENT DOCUMENTS

CN 108490029 A 9/2018
CN 109483107 A 3/2019

(Continued)

OTHER PUBLICATIONS

International Search Report issued in PCT/JP2021/048467; mailed Mar. 22, 2022.

(Continued)

*Primary Examiner* — Sath V Perungavoor

(74) *Attorney, Agent, or Firm* — Studebaker Brackett PLLC

(57) ABSTRACT

Provided are an image analysis apparatus, an image analysis method, and a program that can reduce erroneous detection of defective portions. An image analysis apparatus includes a processor. The processor is configured to acquire an infrared thermal image that is a captured image of a structure to be inspected, acquire a visible image that is a captured image of the structure to be inspected, determine a temperature defect from the infrared thermal image, and estimate a cause of the temperature defect on the basis of, for the temperature defect, at least temperature defect information obtained from the infrared thermal image, and surface defect information obtained from the visible image.

11 Claims, 13 Drawing Sheets

(56)                References Cited

U.S. PATENT DOCUMENTS

| | | | | |
|---|---|---|---|---|
| 2003/0021462 A1* | 1/2003 | Sakai | G06T 7/001 | |
| | | | | 382/145 |
| 2006/0222237 A1* | 10/2006 | Du | G01N 25/72 | |
| | | | | 382/152 |
| 2006/0249679 A1 | 11/2006 | Johnson et al. | | |
| 2008/0099678 A1 | 5/2008 | Johnson et al. | | |
| 2010/0260374 A1 | 10/2010 | Akashi et al. | | |
| 2011/0062339 A1* | 3/2011 | Ruhge | G01N 29/34 | |
| | | | | 250/340 |
| 2011/0123093 A1* | 5/2011 | Alloo | G01N 25/72 | |
| | | | | 382/149 |
| 2017/0103507 A1 | 4/2017 | Fuchs | | |
| 2018/0059065 A1 | 3/2018 | Hull et al. | | |
| 2019/0289227 A1 | 9/2019 | Hirosawa | | |
| 2019/0371014 A1 | 12/2019 | Etoh | | |
| 2020/0184630 A1 | 6/2020 | Wang et al. | | |
| 2021/0272272 A1* | 9/2021 | Matsumoto | G06V 10/764 | |
| 2023/0342907 A1 | 10/2023 | Katsuyama | | |
| 2024/0177325 A1 | 5/2024 | Katsuyama | | |
| 2025/0146964 A1* | 5/2025 | Porat | G01N 21/95684 | |

FOREIGN PATENT DOCUMENTS

| | | | |
|---|---|---|---|
| EP | 2 357 466 A1 | | 8/2011 |
| JP | H05307013 A | * | 11/1993 |
| JP | H09-281065 A | | 10/1997 |
| JP | 2005-016991 A | | 1/2005 |
| JP | 2005-016995 A | | 1/2005 |
| JP | 2005-172683 A | | 6/2005 |
| JP | 2005-338359 A | | 12/2005 |
| JP | 2006-177869 A | | 7/2006 |
| JP | 2007-285778 A | | 11/2007 |
| JP | 2011-099687 A | | 5/2011 |
| JP | 2011-226936 A | | 11/2011 |
| JP | 5140892 B2 | | 2/2013 |
| JP | 2013-096741 A | | 5/2013 |
| JP | 2013-224849 A | | 10/2013 |
| JP | 5318728 B2 | * | 10/2013 |
| JP | 2016065809 A | * | 4/2016 |
| JP | 2017-203761 A | | 11/2017 |
| WO | 2010/046967 A1 | | 4/2010 |
| WO | 2018/155267 A1 | | 8/2018 |

OTHER PUBLICATIONS

International Preliminary Report On Patentability (Chapter I) and Written Opinion of the International Searching Authority issued in PCT/JP2021/048467; issued Jul. 4, 2023.

The extended European search report issued by the European Patent Office on Jun. 10, 2024, which corresponds to European Patent Application No. 21919738.1-1001 and is related to U.S. Appl. No. 18/344,823.

International Search Report issued in PCT/JP2021/036558; mailed Dec. 14, 2021.

International Preliminary Report On Patentability (Chapter I) and Written Opinion of the International Searching Authority issued in PCT/JP2021/036558; issued May 2, 2023.

The extended European search report issued by the European Patent Office on Mar. 18, 2024, which corresponds to European Patent Application No. 21885821.5-1001.

An Office Action; "Notice of Reasons for Refusal," mailed by the Japanese Patent Office on Mar. 17, 2025, which corresponds to Japanese Patent Application No. 2022-558949.

An Office Action mailed by China National Intellectual Property Administration on Aug. 4, 2025, which corresponds to Chinese Patent Application No. 202180073014.4.

An Office Action mailed by the United States Patent and Trademark Office on Aug. 19, 2025, which corresponds to U.S. Appl. No. 18/308,731.

Computer translation of JP 2013-224849 A, downloaded from the JPO website (Year: 2025); original document submitted on Aug. 18, 2023.

An Office Action mailed by China National Intellectual Property Administration on Sep. 30, 2025, which corresponds to Chinese Patent Application No.202180090589.7 and is related to U.S. Appl. No. 18/344,823; with English language translation.

An Office Action, "Notice of Reasons for Refusal," mailed by the Japanese Patent Office on Nov. 7, 2025, which corresponds to Japanese Patent Application No. 2022-575515; with English language translation.

An Office Action mailed by China National Intellectual Property Administration on Nov. 10, 2025, which corresponds to Chinese Patent Application No. 202180073014.4; with English language translation.

Communication pursuant to Article 94(3) EPC issued by the European Patent Office on Feb. 2, 2026, which corresponds to European Patent Application No. 21919738.1-1001 and is related to U.S. Appl. No. 18/344,823.

* cited by examiner

| INFRARED THERMAL IMAGE | ~101 |

| TEMPERATURE DEFECT INFORMATION | ~102 |

| VISIBLE IMAGE | ~103 |

| SURFACE DEFECT INFORMATION | ~104 |

FIG. 4

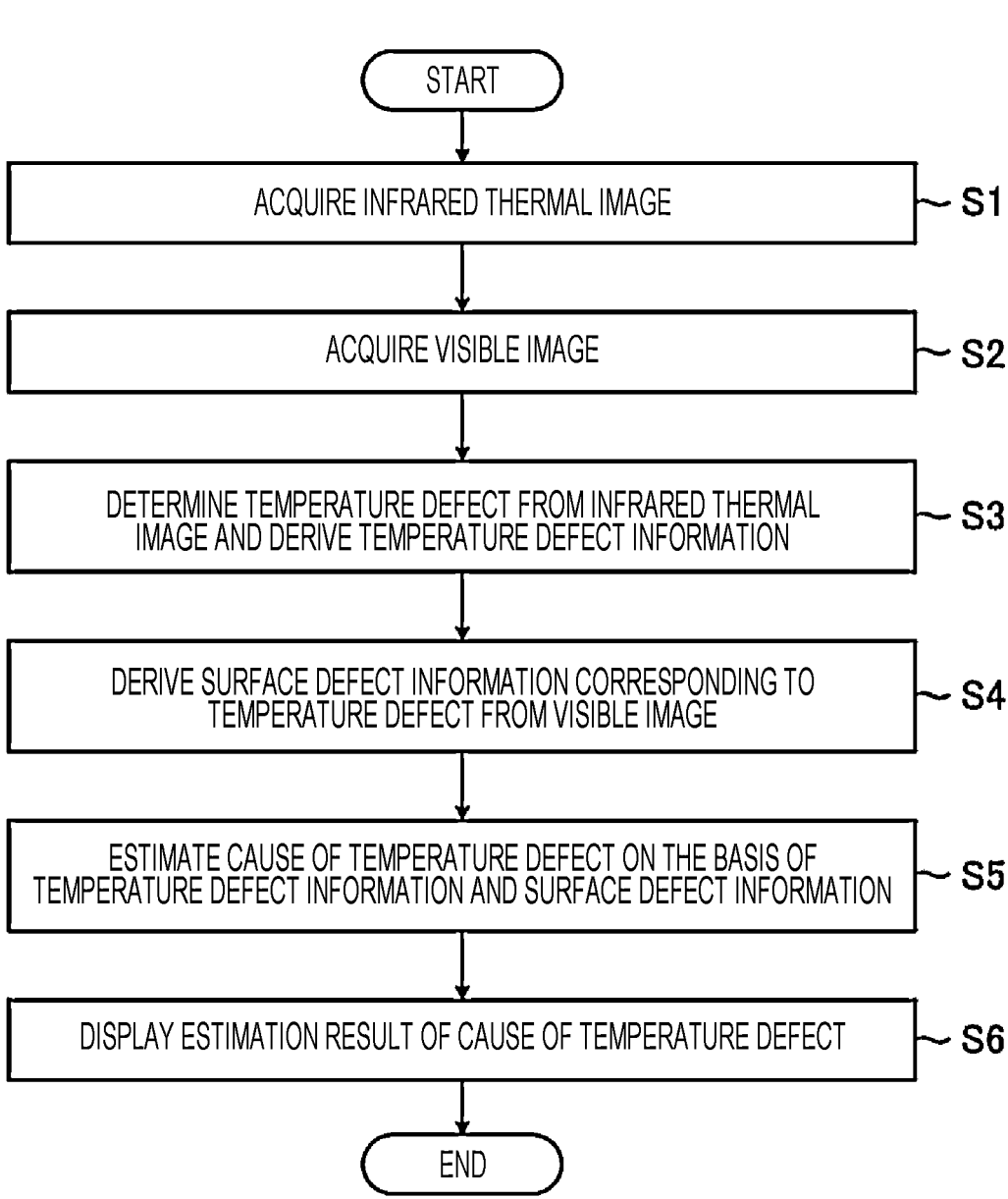

START

| ACQUIRE INFRARED THERMAL IMAGE | ~ S1 |

| ACQUIRE VISIBLE IMAGE | ~ S2 |

| DETERMINE TEMPERATURE DEFECT FROM INFRARED THERMAL IMAGE AND DERIVE TEMPERATURE DEFECT INFORMATION | ~ S3 |

| DERIVE SURFACE DEFECT INFORMATION CORRESPONDING TO TEMPERATURE DEFECT FROM VISIBLE IMAGE | ~ S4 |

| ESTIMATE CAUSE OF TEMPERATURE DEFECT ON THE BASIS OF TEMPERATURE DEFECT INFORMATION AND SURFACE DEFECT INFORMATION | ~ S5 |

| DISPLAY ESTIMATION RESULT OF CAUSE OF TEMPERATURE DEFECT | ~ S6 |

END

FIG. 8A
FIG. 8B
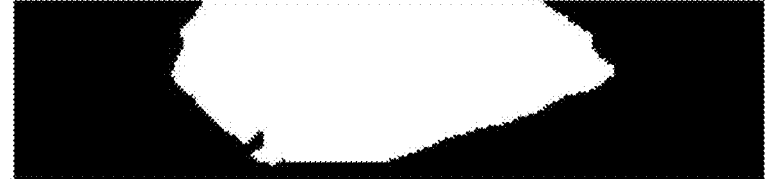
FIG. 9A          FIG. 9B
 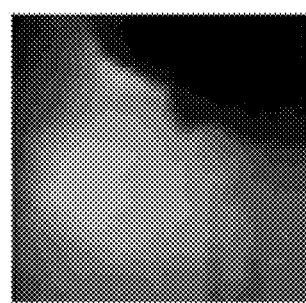

FIG. 10A
FIG. 10B
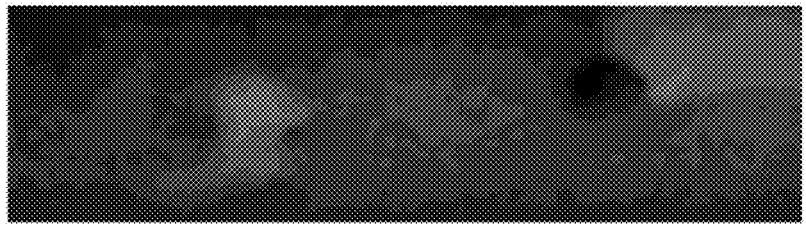
FIG. 11A FIG. 11B

IMAGE ANALYSIS APPARATUS, IMAGE ANALYSIS METHOD, AND PROGRAM

CROSS-REFERENCE TO RELATED APPLICATIONS

The present application is a Continuation of PCT International Application No. PCT/JP2021/048467 filed on Dec. 27, 2021 claiming priority under 35 U.S.C § 119(a) to Japanese Patent Application No. 2021-004419 filed on Jan. 14, 2021. Each of the above applications is hereby expressly incorporated by reference, in its entirety, into the present application.

BACKGROUND OF THE INVENTION

1. Field of the Invention

The present invention relates to an image analysis apparatus, an image analysis method, and a program.

2. Description of the Related Art

Techniques are known for discriminating a defective portion such as a bulging or cracked portion included in a structure of concrete or the like from a normal portion by using an infrared thermal image acquired by capturing an image of the structure with an infrared camera. If the structure has a defective portion, the surface temperature of the defective portion is higher than the surface temperature of the normal portion when the temperature is increasing such as during the daytime. When the temperature is decreasing such as during the nighttime, conversely, the surface temperature of the defective portion is lower than the surface temperature of the normal portion. Accordingly, if the infrared thermal image has a portion different in surface temperature from the surroundings, it can be determined that a defective portion is present in this site.

In infrared inspection, however, a portion different in surface temperature from the surroundings is present although a structure does not have a defective portion such as a bulging portion. For example, in a repaired structure, the surface temperature of a repair site may be different from the surface temperature of the surrounding concrete surface due to the difference in thermal conductivity between the repair material and the surrounding concrete surface. In addition, due to the difference in infrared emissivity between the repair site and the surrounding concrete surface, the apparent surface temperature of the repair site in the infrared thermal image may be different from that of the surrounding concrete surface. Also in a case where a foreign substance such as free lime adheres to the surface, the actual temperature and/or apparent temperature of the corresponding portion may be different from that of the surrounding concrete surface. Other factors such as color unevenness (due to mold, moss, a peeling agent, water effect, or the like), joints, steps, cement paste, sand streaks, rust fluid, rust, water leakage, surface irregularities, and rock pockets may also generate portions having different actual and/or apparent surface temperatures from the surroundings. As described above, infrared inspection has a problem in that a portion different in surface temperature from the surroundings is likely to be present although a structure does not have a defective portion such as a bulging portion, that is, erroneous detection is likely to occur.

To address this problem, JP2013-096741A discloses the following method. A factor affecting a thermal image of a structure and a relational expression of multivariate analysis for determining a probability that an abnormal portion extracted from the thermal image of the structure by using information on the factor includes a fault are specified. Then, an image of the structure is captured with an infrared camera to acquire a thermal image. An abnormal portion having a different temperature from the surroundings is extracted from the thermal image, and information on a factor in the abnormal portion is identified. Thereafter, the identified information on the factor is converted into a numerical value, and the numerical value is applied to a relational expression of multivariate analysis to determine a probability that the extracted abnormal portion includes a fault.

SUMMARY OF THE INVENTION

JP2013-096741A discloses a method for extracting an abnormal portion different in surface temperature from the surroundings in an infrared thermal image, then identifying "the presence or absence of cracking" and a "surface state" by an appearance image (visible image) or by human visual observation, and applying the results to an equation of multivariate analysis to determine a probability that the abnormal portion includes a fault. The term "surface state", as used here, refers to the presence or absence of a defect on a concrete structure surface, such as color unevenness, surface unevenness, or free lime. Since many erroneous detections (abnormal portions different in surface temperature from the surroundings although no defect is present in the structure) are caused by defects on a structure surface, it is considered to be effective to determine the presence or absence of a defect on a structure surface to reduce erroneous detections.

However, the invention in JP2013-096741A is merely directed to the statistical determination of the probability of a fault based on information on the determined presence or absence of a defect (including cracking) on the structure surface. The disclosed method is insufficient to reduce erroneous detection.

The present invention has been made in view of such circumstances, and an object thereof is to provide an image analysis apparatus, an image analysis method, and a program that can reduce erroneous detection of defective portions.

An image analysis apparatus according to a first aspect includes a processor. The processor is configured to acquire an infrared thermal image that is a captured image of a structure to be inspected, acquire a visible image that is a captured image of the structure to be inspected, determine a temperature defect from the infrared thermal image, and estimate a cause of the temperature defect on the basis of, for the temperature defect, at least temperature defect information obtained from the infrared thermal image, and surface defect information obtained from the visible image.

In an image analysis apparatus according to a second aspect, the temperature defect information includes a temperature distribution of the temperature defect in the infrared thermal image and/or information obtained from the temperature distribution.

In an image analysis apparatus according to a third aspect, the temperature defect information includes information on a shape and/or a size of the temperature defect.

In an image analysis apparatus according to a fourth aspect, the surface defect information includes a luminance distribution in the visible image and/or information obtained from the luminance distribution.

In an image analysis apparatus according to a fifth aspect, the surface defect information includes information on at least one of a type, a shape, or a position of the surface defect.

In an image analysis apparatus according to a sixth aspect, the processor is configured to estimate the cause of the temperature defect on the basis of a similarity between the temperature defect information and the surface defect information.

In an image analysis apparatus according to a seventh aspect, the processor is configured to, in response to estimating that the cause of the temperature defect is the surface defect, estimate a temperature distribution caused by the surface defect and reduce the temperature distribution from the infrared thermal image.

In an image analysis apparatus according to an eighth aspect, the similarity includes a partial similarity.

In an image analysis apparatus according to a ninth aspect, the processor is configured to determine that the surface defect corresponding to the temperature defect is a crack or peeling, evaluate a similarity between the temperature defect information and the surface defect information, and estimate that the cause of the temperature defect is bulging accompanied by the crack or peeling when the temperature defect information and the surface defect information are similar at least in part.

In an image analysis apparatus according to a tenth aspect, the processor is configured to determine that the surface defect corresponding to the temperature defect is a crack or peeling, evaluate whether the surface defect is present in a size of the temperature defect and/or in the vicinity of a boundary of the temperature defect, and estimate that the cause of the temperature defect is bulging accompanied by the crack or peeling when the surface defect is present.

In an image analysis apparatus according to an eleventh aspect, the processor is configured to estimate the cause of the temperature defect on the basis of a temperature gradient at a boundary of the temperature defect.

In an image analysis apparatus according to a twelfth aspect, the surface defect includes at least one of a repair site, free lime, a joint, a step, a crack, or peeling.

In an image analysis apparatus according to a thirteenth aspect, the visible image is an image obtained by imaging a reflection intensity distribution over two or more different wavelength ranges in a wavelength range of visible light.

An image analysis apparatus according to a fourteenth aspect further includes a display device. The processor is configured to display an estimation result of the cause of the temperature defect on the display device.

An image analysis method according to a fifteenth aspect includes a step of acquiring an infrared thermal image that is a captured image of a structure to be inspected, a step of acquiring a visible image that is a captured image of the structure to be inspected, a step of determining a temperature defect from the infrared thermal image, and a step of estimating a cause of the temperature defect on the basis of, for the temperature defect, at least temperature defect information obtained from the infrared thermal image, and surface defect information obtained from the visible image.

A program for causing a computer to perform execution according to a sixteenth aspect causes the computer to execute a step of acquiring an infrared thermal image that is a captured image of a structure to be inspected, a step of acquiring a visible image that is a captured image of the structure to be inspected, a step of determining a temperature defect from the infrared thermal image, and a step of estimating a cause of the temperature defect on the basis of, for the temperature defect, at least temperature defect information obtained from the infrared thermal image, and surface defect information obtained from the visible image.

An image analysis apparatus, an image analysis method, and a program of the present invention can reduce erroneous detection of defective portions.

BRIEF DESCRIPTION OF THE DRAWINGS

FIG. 3 is a diagram illustrating information stored in a storage unit;

FIG. 4 is a flow diagram illustrating an analysis method using the image analysis apparatus;

FIGS. 8A and 8B illustrate binary images representing the shape of a defect in the images in FIGS. 7A and 7B;

FIGS. 9A and 9B illustrate an infrared thermal image and a visible image that are captured images of a structure including a peeled area;

FIGS. 10A and 10B illustrate an infrared thermal image and a visible image that are captured images of a structure including two peeled areas;

FIGS. 11A and 11B illustrate binary images representing the shape of a defect in the images in FIGS. 9A and 9B;

DESCRIPTION OF THE PREFERRED EMBODIMENTS

Figure 1:
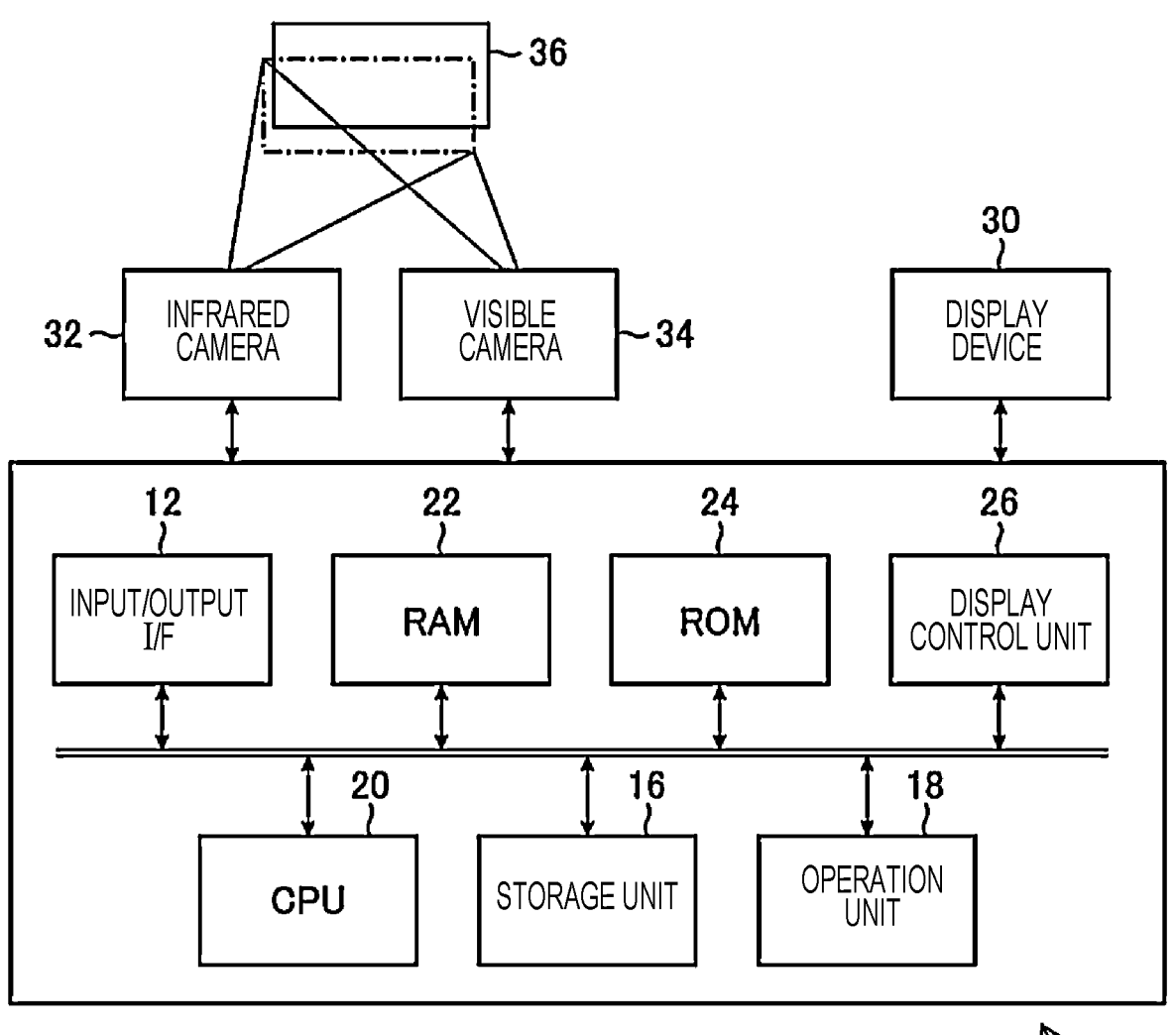
FIG. 1 is a block diagram illustrating an example hardware configuration of an image analysis apparatus.

An image analysis apparatus according to an embodiment is an image analysis apparatus including a processor configured to acquire an infrared thermal image that is a captured image of a structure to be inspected, acquire a visible image that is a captured image of the structure to be inspected, determine a temperature defect on the basis of the infrared thermal image, derive temperature defect information, derive surface defect information from a surface defect based on a visible image of an area corresponding to the temperature defect, and estimate a cause of the temperature defect on the basis of the temperature defect information and the surface defect information.

In relation to the invention according to an embodiment having the configuration described above, the present inventor has made intensive studies on reducing erroneous detection of defective portions, and as a result, has found the following, leading to the present invention.

To reduce erroneous detection, it is necessary to determine the effect of an identified structure-surface defect (hereafter also referred to as a surface defect) on an infrared thermal image (determine the cause of an abnormal portion). For this reason, it is essential to analyze the relationship between an abnormal portion extracted from an infrared thermal image and the position, shape, and the like of a surface defect identified from a visible image. The present inventor has compared and investigated an infrared thermal image and a visible image, which are captured images of a concrete structure, and has found that the relationship between a surface defect (such as color unevenness, a joint, a step, or rust fluid) identified in the visible image and a temperature defect identified in the infrared thermal image (a portion locally different in surface temperature from the surroundings in the infrared thermal image is hereafter referred to as a temperature defect) differs depending on the position in the structure or the thermal environment such as the image capturing time, that is, the effect of a surface defect of a concrete surface on the surface temperature differs depending on the position in the structure or the thermal environment such as the image capturing time.

For example, in a case where an image of a balustrade of a bridge is captured in a sunny day, the position and shape of color unevenness or rust fluid identified from a visible image and the position and shape of a temperature defect identified from an infrared thermal image clearly match, that is, color unevenness or rust fluid greatly affects the surface temperature. By contrast, in a case where an image of the bottom surface of a floor slab of the same bridge is captured in the same time period, color unevenness or rust fluid similar to that of the balustrade appears in a visible image, whereas the corresponding temperature defect does not appear in an infrared thermal image in some cases. The present inventor considers that this difference is caused by solar radiation on the balustrade in the sunny day, with the amount of absorbed solar radiation being different between the portion of color unevenness or rust fluid and the other portions. As described above, the effect of a surface defect on the surface temperature differs depending on the thermal environment. Thus, the present inventor has found that it is necessary to determine the effect (determine the cause of the temperature defect) and it is therefore essential to analyze the relationship in position, shape, and the like between the surface defect and the temperature defect.

Preferred embodiments of an image analysis apparatus, an image analysis method, and a program according to the present invention will be described hereinafter with reference to the accompanying drawings.

Hardware Configuration of Image Analysis Apparatus

FIG. 1 is a block diagram illustrating an example hardware configuration of an image analysis apparatus according to an embodiment.

An image analysis apparatus 10 illustrated in FIG. 1 can be implemented as a computer or a workstation. The image analysis apparatus 10 of this example is mainly constituted by an input/output interface 12, a storage unit 16, an operation unit 18, a CPU (Central Processing Unit) 20, a RAM (Random Access Memory) 22, a ROM (Read Only Memory) 24, and a display control unit 26. A display device 30 is connected to the image analysis apparatus 10. The display control unit 26 controls the display device 30 to perform display in accordance with a command from the CPU 20. The display device 30 is constituted by a monitor, for example.

The input/output interface 12 (input/output I/F in FIG. 1) is capable of inputting various kinds of data (information) to the image analysis apparatus 10. For example, data stored in the storage unit 16 is input via the input/output interface 12.

The CPU (processor) 20 reads various programs stored in the storage unit 16, the ROM 24, or the like, loads the programs onto the RAM 22, and performs calculation to perform overall control of the units. Further, the CPU 20 reads a program stored in the storage unit 16 or the ROM 24, performs calculation by using the RAM 22, and performs various kinds of processing of the image analysis apparatus 10.

An infrared camera 32 illustrated in FIG. 1 captures an image of a structure 36 to be inspected, and acquires an infrared thermal image of the structure surface. A visible camera 34 captures an image of the structure 36 to be inspected, and acquires a visible image of the structure 36.

The image analysis apparatus 10 is capable of acquiring an infrared thermal image from the infrared camera 32 via the input/output interface 12. The image analysis apparatus 10 is further capable of acquiring a visible image from the visible camera 34 via the input/output interface 12. The acquired infrared thermal image and visible image can be stored in the storage unit 16, for example.

Figure 2:
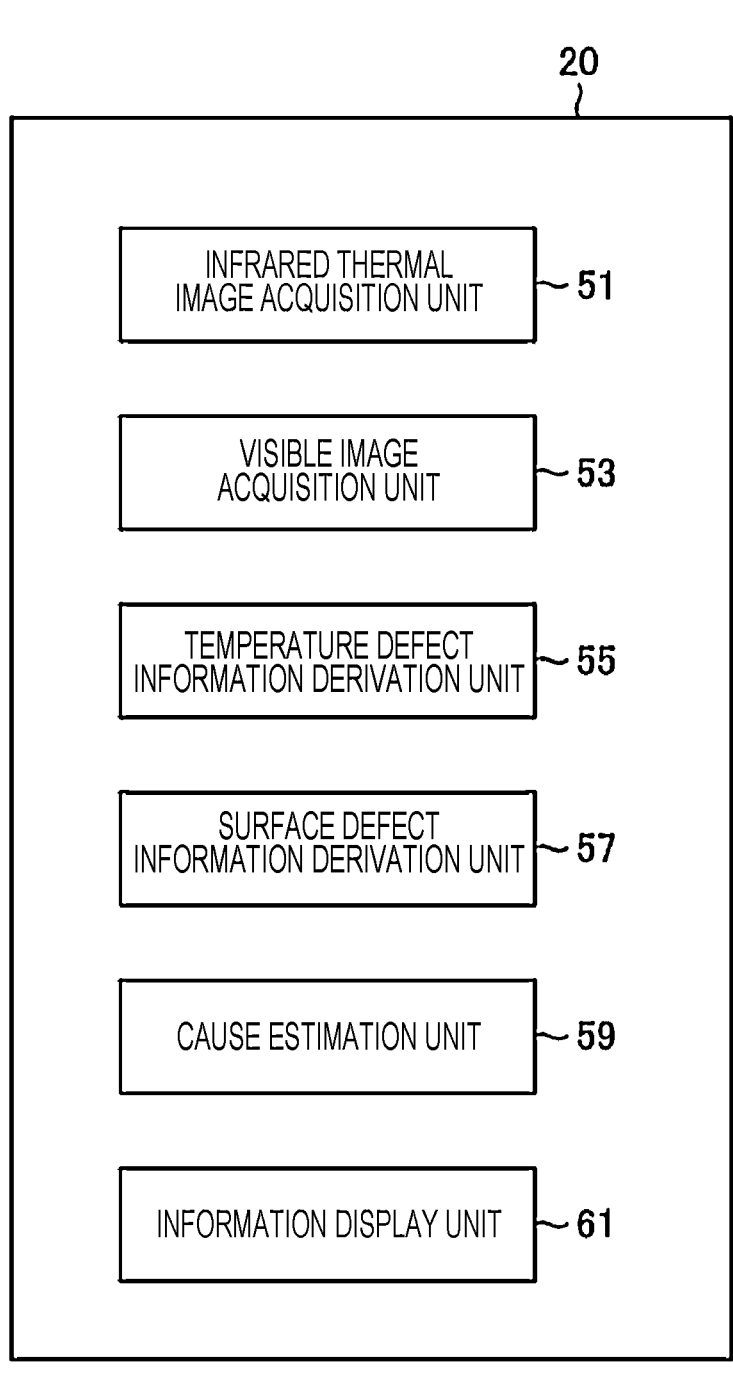
FIG. 2 is a block diagram illustrating processing functions implemented by a CPU.

FIG. 2 is a block diagram illustrating processing functions implemented by the CPU 20.

The CPU 20 has an infrared thermal image acquisition unit 51, a visible image acquisition unit 53, a temperature defect information derivation unit 55, a surface defect information derivation unit 57, a cause estimation unit 59, and an information display unit 61. The specific processing functions of the respective units will be described below. The infrared thermal image acquisition unit 51, the visible image acquisition unit 53, the temperature defect information derivation unit 55, the surface defect information derivation unit 57, the cause estimation unit 59, and the information display unit 61 are portions of the CPU 20. Thus, in other words, the CPU 20 executes the processing of the respective units.

Returning back to FIG. 1, the storage unit 16 stores data and programs for operating the image analysis apparatus 10, such as an operating system and a program for executing an image analysis method. The storage unit 16 also stores information and the like used in an embodiment described below.

Figure 3:
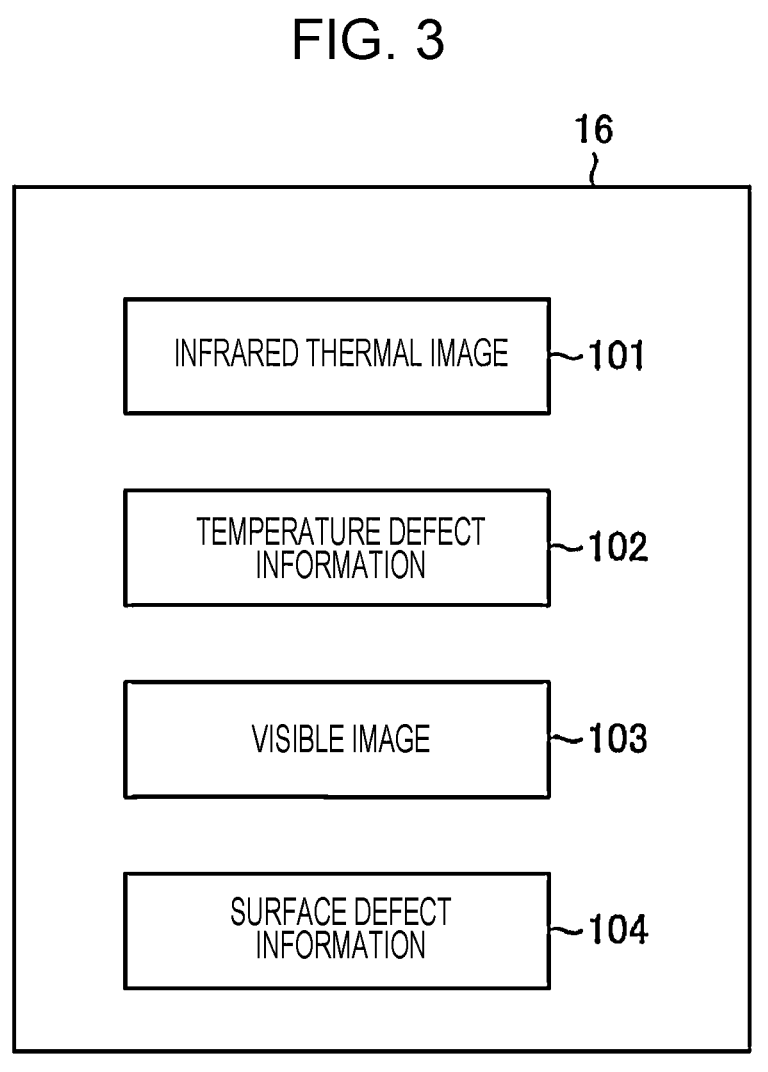

FIG. 3 is a diagram illustrating information and so on stored in the storage unit 16. The storage unit 16 is a memory constituted by a CD (Compact Disk), a DVD (Digital Versatile Disk), a hard disk, various semiconductor memories such as a flash memory, or the like.

The storage unit 16 mainly stores an infrared thermal image 101, temperature defect information 102, a visible image 103, and surface defect information 104.

The infrared thermal image 101 is an image captured by the infrared camera 32. The infrared thermal image 101 is an image indicating a temperature distribution of the structure surface, the temperature distribution being obtained by detecting infrared radiant energy emitted from the structure 36 and converting the infrared radiant energy into temperature.

The temperature defect information 102 is a temperature distribution of the temperature defect in the infrared thermal image 101 and/or information obtained from the temperature distribution.

The visible image 103 is an image captured by the visible camera 34. The visible image 103 is an image indicating the distribution of the reflection intensity of visible light from the surface of the structure 36. A typical visible image is composed of RGB images obtained by imaging the respective reflection intensity distributions over three different wavelength ranges in the wavelength range of visible light. That is, a typical visible image has color information (RGB signal value) for each pixel. Also in this example, the visible image 103 is assumed to have color information. The luminance of the visible image 103 described below indicates a signal value of the visible image 103. The luminance of each pixel of the visible image 103 reflects the reflection intensity of visible light at a position on the surface of the structure 36 to which the pixel corresponds.

The surface defect information 104 is information on a surface defect in an area corresponding to the temperature defect in the visible image 103. The surface defect information 104 is a luminance distribution in the visible image 103 and/or information obtained from the luminance distribution.

The operation unit 18 illustrated in FIG. 1 includes a keyboard and a mouse. The user can use these devices to cause the image analysis apparatus 10 to perform necessary processing. With the use of a touch panel device, the display device 30 can function as an operation unit.

The display device 30 is a device such as a liquid crystal display, for example, and is capable of displaying a result obtained by the image analysis apparatus 10.

FIG. 4 is a flow diagram illustrating an image analysis method using the image analysis apparatus 10. As illustrated in FIG. 4, the image analysis method includes an infrared thermal image acquisition step (step S1), a visible image acquisition step (step S2), a temperature defect information derivation step (step S3), a surface defect information derivation step (step S4), a cause estimation step (step S5), and an estimation result display step (step S6).

Infrared Thermal Image Acquisition Step

The infrared thermal image acquisition unit 51 acquires an infrared thermal image that is a captured image of the structure 36 to be inspected (infrared thermal image acquisition step: step S1). The infrared thermal image is the infrared thermal image 101 stored in the storage unit 16. The infrared thermal image 101 is acquired from the storage unit 16 by the infrared thermal image acquisition unit 51. If the storage unit 16 does not store the infrared thermal image 101, the infrared thermal image acquisition unit 51 acquires the infrared thermal image 101 from the outside. For example, the infrared thermal image acquisition unit 51 can acquire the infrared thermal image 101 via the input/output interface 12 over a network. Alternatively, the infrared thermal image acquisition unit 51 can acquire the infrared thermal image 101 from the infrared camera 32 via the input/output interface 12.

Visible Image Acquisition Step

The visible image acquisition unit 53 acquires a visible image that is a captured image of the structure 36 to be inspected (visible image acquisition step: step S2). The visible image is the visible image 103 stored in the storage unit 16. The visible image 103 is acquired from the storage unit 16 by the visible image acquisition unit 53. If the storage unit 16 does not store the visible image 103, the visible image acquisition unit 53 acquires the visible image 103 from the outside. For example, the visible image acquisition unit 53 can acquire the visible image 103 via the input/output interface 12 over a network. Alternatively, the visible image acquisition unit 53 can acquire the visible image 103 from the visible camera 34 via the input/output interface 12.

Temperature Defect Information Derivation Step

Subsequently, the temperature defect information derivation unit 55 determines a temperature defect on the basis of the infrared thermal image 101 and derives the temperature defect information 102 (temperature defect information derivation step: step S3).

The temperature defect information derivation unit 55 determines that a locally aggregated portion different in surface temperature from the surroundings is a temperature defect, extracts the temperature defect from the infrared thermal image 101, and derives temperature defect information 102.

For example, a portion having a temperature difference exceeding a predetermined temperature difference from the average temperature over a predetermined range of the structure surface in the infrared thermal image 101 (a portion having a higher temperature than the surroundings when the temperature is increasing such as during the daytime, and a portion having a lower temperature than the surroundings when the temperature is decreasing such as during the nighttime) can be determined to be a temperature defect and can be extracted. Portions that are different in surface temperature from the surroundings and that are spatially joined together in an aggregated manner or are not joined together but are distributed at distances shorter than a predetermined distance can be determined to be one temperature defect. The temperature defect is not necessarily a portion where the actual surface temperature is different from that of the surroundings. That is, even a portion where the actual surface temperature is the same as that of the surroundings, but the infrared emissivity is different may be determined to be a temperature defect because the surface temperature of the portion is different from that of the surroundings in the infrared thermal image 101.

The infrared thermal image 101 may be an infrared thermal image itself obtained by capturing an image of the target structure 36 of concrete with the infrared camera 32. Alternatively, an image obtained by processing the original infrared thermal image 101 may be used to facilitate determination of a temperature defect and/or derivation of temperature defect information. For example, a partial difference in the amount of heat received on the surface of the structure 36 or the amount of heat dissipated from the surface of the structure 36 may often cause a gradient (temperature gradient) of the surface temperature of the structure 36. Accordingly, the original infrared thermal image 101 may be processed such that the temperature gradient can be reduced, and a temperature defect may be determined and extracted from the processed image to derive the temperature defect information 102.

The temperature defect information 102 is information indicating the temperature distribution (spatial distribution of temperature) of the temperature defect and is information indicating the temperature distribution over a range including at least the entire temperature defect (if the temperature defect extends to an end of the infrared thermal image 101, the range including the end). In the cause estimation step (step S5) described below, the temperature defect information 102 is information indicating a temperature distribution over a range as wide as possible, which is preferable for cause estimation.

The temperature defect information 102 may be the temperature distribution itself in the original infrared thermal image 101 or may be a distribution obtained by coarsely quantizing the original temperature distribution, for example, a binary, ternary, or quaternary distribution. The temperature defect information 102 may be information indicating the shape of the temperature defect. For example, the binary temperature distribution can be referred to as information indicating the shape of the temperature defect. The temperature defect information may be information indicating the size of a temperature defect approximated by a rectangular shape, an elliptic shape, or the like.

Accordingly, the temperature defect information 102 is a temperature distribution of the temperature defect in the infrared thermal image 101 and/or information obtained from the temperature distribution.

The temperature defect information derivation unit 55 can determine a plurality of temperature defects (i=1, 2, 3, . . . N) and derive the temperature defect information 102.
Surface Defect Information Derivation Step The surface defect information derivation unit 57 derives the surface defect information 104 on the basis of the visible image 103 (surface defect information derivation step: step S4).

The surface defect information derivation unit 57 derives the surface defect information 104 of an area corresponding to a temperature defect (i=1, 2, 3, . . . N) from the visible image 103. The defect means "a state changed from the initial state" or "a state that is not normal". In embodiments, in particular, a surface state that affects the temperature of a concrete surface in an infrared thermal image and can cause a temperature defect, such as a repair site, adhesion of a foreign substance such as free lime, color unevenness (due to mold, moss, a peeling agent, water effect, or the like), joints, steps, cement paste, sand streaks, rust fluid or rust, water leakage, surface irregularities, or rock pockets, is referred to as a "surface defect". Cracks or peeling is also referred to as a "surface defect".

The surface defect information 104 is information indicating the presence or absence, type, shape, position, and the like of a surface defect, and is obtained from the luminance distribution (spatial distribution of luminance) in the visible image 103. The luminance distribution of a surface defect such as color unevenness, rust fluid, or rust in the visible image 103 is effective to estimate the cause of a temperature defect.

The luminance of each pixel in the visible image 103 reflects the reflection intensity of visible light at a position on the surface of the structure 36 to which the pixel corresponds. The difference in luminance reflects a difference in the reflection intensity of visible light with which the surface of the structure 36 is uniformly irradiated, that is, a difference in reflectance. That is, the difference in luminance reflects a difference in the absorbance of visible light. Accordingly, the luminance distribution over the surface of the structure 36 in the visible image 103 reflects the distribution of the absorbance of visible light such as solar radiation uniformly illuminating the surface of the structure 36, that is, the distribution of the amount of absorbed visible light. Likewise, the luminance distribution of each surface defect on the surface of the structure 36 reflects the distribution of the amount of absorbed visible light in the surface defect, and is thus effective to estimate the cause of a temperature defect. For this reason, the surface defect information 104 may be information indicating the luminance distribution of a surface defect, and may be the luminance distribution itself in the visible image 103. Alternatively, the surface defect information 104 may be a distribution obtained by coarsely quantizing the luminance distribution, for example, such as a binary, ternary, or quaternary distribution.

Accordingly, the surface defect information 104 is information on a surface defect in an area corresponding to a temperature defect in the visible image 103. The surface defect information 104 is a luminance distribution in the visible image 103 and/or information obtained from the luminance distribution.

The luminance distribution of an area corresponding to a temperature defect (the luminance distribution itself in the visible image 103 or a distribution obtained by coarsely quantizing the luminance distribution) is information indicating the presence or absence, type, shape, position, and luminance distribution of a surface defect over the area (information included). The luminance distribution may be used as the surface defect information 104.

To explicitly derive, as the surface defect information 104, at least one of the presence or absence, type, shape, position, or luminance distribution of a surface defect from the luminance distribution of an area corresponding to a temperature defect, a crack and peeling, among surface defects, and other surface defects (surface states that affect the temperature of the concrete surface in the infrared thermal image 101 and may cause erroneous detection of defects in the structure 36) are distinguishably determined and extracted. A linearly connected portion having a lower luminance than the surroundings by more than a predetermined luminance difference and having a length greater than or equal to a predetermined value is determined to be a crack and extracted from the visible image 103. Various methods for extracting a crack by using machine learning and various methods for extracting a crack with focus on a line shape on the basis of its feature have been proposed. Any of such methods may be used.

Since a peeled area is clearly different in luminance from the original concrete surface and is also different in texture, contrast, and frequency spectrum of the luminance distribution, an aggregated portion having a luminance difference exceeding a predetermined luminance difference and differences in texture, contrast, and frequency spectrum of the luminance distribution exceeding predetermined differences from the surroundings is determined to be peeling and is extracted. Since a portion corresponding to a step between the peeled area and the original concrete surface is dark (has low luminance), the darkness (low luminance) of the boundary portion can also be a feature effective to determine peeling. Other surface defects, namely, a locally aggregated portion different in luminance from the surroundings and/or a locally aggregated portion different in texture of the luminance distribution from the surroundings and/or a locally aggregated portion different in frequency spectrum of the luminance distribution from the surroundings and/or a locally aggregated portion different in contrast of the luminance distribution from the surroundings, are determined and extracted from the visible image 103. For example, a portion having a luminance difference exceeding a predetermined luminance difference from the average luminance is determined to be another surface defect and is extracted. Portions that are different from the surroundings in one or more of luminance, texture of the luminance distribution, frequency spectrum of the luminance distribution, and contrast of the luminance distribution and that are spatially joined together in an aggregated manner or are not joined together but are distributed at distances shorter than a predetermined distance are determined to be one surface defect and are extracted.

Through the processing described above, at least one of the presence or absence, shape, position, or luminance distribution of a crack, peeling, and each of the other surface defects is obtained. In the cause estimation step (step S5) described below, the type of each of the other surface defects need not necessarily be identified in detail (such as a repair site, free lime, color unevenness, joints, steps, cement paste, sand streaks, rust fluid or rust, water leakage, surface irregularities, or rock pockets). However, identifying the type of each surface defect makes it possible to more appropriately estimate the cause in the cause estimation step (step S5).

Specifically, for a surface defect such as color unevenness, rust fluid, or rust in which a difference in the amount of absorbed visible light from the surrounding concrete surface is a main cause of a difference in surface temperature from the surroundings in the infrared thermal image 101, as described above, the luminance distribution reflects the distribution of the amount of absorbed visible light. Accordingly, the luminance distribution is effective as the surface defect information 104 to estimate the cause in the cause estimation step (step S5).

By contrast, for a surface defect for which the luminance distribution is not effective to estimate the cause, that is, a surface defect for which the luminance distribution is rather noise, the following is effective. For example, for a surface defect such as a repair site or free lime in which a difference in thermal conductivity or infrared emissivity from the surrounding concrete surface is a main cause of a difference in surface temperature from the surroundings in the infrared thermal image 101, or a surface defect such as a joint or a step in which a difference in surface temperature from the surroundings in the infrared thermal image 101 occurs due to a structural factor, the shape is effective as the surface defect information 104 to estimate the cause in the cause estimation step (step S5). Accordingly, it is preferable to identify the type of each of the other surface defects in detail. The type of an extracted surface defect can be identified in detail on the basis of features such as average luminance, contrast, luminance variance, texture, frequency spectrum, and shape.

The visible image 103 is typically composed of RGB images obtained by imaging the respective reflection intensity distributions over three different wavelength ranges in the wavelength range of visible light. A crack, peeling, and other surface defects may be determined and extracted from the luminance distribution of any of the RGB colors. However, a surface defect such as rust fluid or rust is greatly different in luminance (difference in reflection intensity) from the concrete surface depending on the RGB color, and thus is preferably determined and extracted from the luminance distribution of the channel having the largest difference. For example, rust fluid or rust is particularly lower in the luminance of B than the concrete surface, that is, the difference in the amount of absorption, which is the difference in reflection intensity, over the wavelength range of B is larger than that of the concrete surface. Accordingly, rust fluid or rust is preferably determined from the luminance distribution of B. However, it is considered that a channel having a large difference in luminance from the concrete surface differs depending on the type of surface defect. For example, depending on the type of color unevenness, the difference in the luminance of the R channel may be particularly large, unlike rust fluid or rust. Accordingly, preferably, the magnitude of luminance variation is evaluated in the luminance distribution of each of the RGB channels, and a crack, peeling, and other surface defects are determined and extracted from the channel having the largest variation. For example, a value obtained by dividing the standard deviation of the luminance in an area corresponding to a temperature defect in the luminance distribution of each of the RGB channels by the average luminance of the concrete surface, that is, a coefficient of variation, may be obtained, and a crack, peeling, and other surface defects may be determined and extracted from the channel having the largest coefficient of variation. The average luminance of the concrete surface may be the average value of the luminance in the area corresponding to the temperature defect, or the average value of the luminance over a wider range including the area corresponding to the temperature defect. The type of each of the other surface defects can be identified in detail on the basis of the features of the extracted surface defect, such as the average luminance, contrast, luminance variance, texture, and frequency spectrum of each of the RGB channels. Also in the case of two types or four or more types of visible images 103, a crack, peeling, and other surface defects can be determined and extracted by using the channel having the largest variation, and the types of the other surface defects can be identified in detail on the basis of the features such as average luminance and contrast of each channel for the two types or four or more types.

The area corresponding to the temperature defect is a range wider than a spatial range corresponding to the temperature defect when the temperature defect is determined from the infrared thermal image 101 in the temperature defect information derivation step (step S3). As described below, in the cause estimation step (step S5), the analysis for estimating the cause of the temperature defect requires surface defect information of a wider range than the range corresponding to the temperature defect. For peeling, in particular, it is necessary to analyze the relationship between a temperature defect and peeling at a different position.

While the infrared thermal image acquisition step (step S1), the visible image acquisition step (step S2), the temperature defect information derivation step (step S3), and the surface defect information derivation step (step S4) have been described in this order, the order of these steps may be changed as appropriate within the scope of an embodiment.

Cause Estimation Step

The cause estimation unit 59 estimates the cause of the temperature defect on the basis of the temperature defect information 102 and the surface defect information 104 (cause estimation step: step S5).

The process of estimating the cause slightly differs depending on the type of the surface defect information 104 derived in the surface defect information derivation step (step S4), and will be described as a first aspect, a second aspect, and a third aspect.

First Aspect

In the first aspect, a description will be given of a case where the luminance distribution of the area corresponding to the temperature defect is used as the surface defect information in the surface defect information derivation step (step S4). A method for estimating the causes of a crack, peeling, and other surface defects will be described.

Other Surface Defects

The range corresponding to the temperature defect derived in the temperature defect information derivation step (step S3) or a slightly wider range including the temperature defect is extracted from the luminance distribution derived in the surface defect information derivation step (step S4). The similarity between the luminance distribution and the temperature distribution over this range is evaluated. If similarity is found, the cause of the temperature defect is estimated to be the surface defect. On the other hand, if no similarity is found, the cause of the temperature defect is estimated to be any factor other than the surface defect, for example, an internal defect such as bulging.

Many methods are available for evaluating the similarity between two distributions. For example, the luminance distribution and the temperature distribution are normalized such that the respective distributions have the same minimum value and the same maximum value, and then the Euclidean distance given by Expression (1) below is calculated to evaluate the similarity therebetween. For example, Expression (1) is calculated, and if the distance is less than or equal to a predetermined value (the closer to 0 the distance is, the more similar the distributions can be determined to be), it may be determined that the luminance distribution and the temperature distribution are similar.

Since the relationship between high and low luminance levels and the relationship between high and low temperatures may be the same or opposite depending on the type of surface defect or the image capturing time, it is necessary to perform calculation for both cases. That is, the Euclidean distance is calculated for the case where the luminance distribution remains unchanged and the case where the luminance level of the luminance distribution is inverted (for example, a distribution in which the original luminance values are subtracted from 255). If either of the distances is less than or equal to a predetermined value, it is determined that similarity is found.

$$\mathrm{sqrt}((v(1,1)-t(1,1))^2+(v(2,1)-t(2,1))^2+\ldots) \qquad \text{Expression (1)}$$

Here, v(x, y) denotes the value of a pixel identified by coordinates (x, y) in the normalized luminance distribution, and t(x, y) denotes the value of a pixel identified by coordinates (x, y) in the normalized temperature distribution.

In another method for evaluating the similarity, for example, Pearson's product-moment correlation coefficient given by Expression (2) below is calculated, and if the absolute value of the correlation coefficient is greater than or equal to a predetermined value (the closer to 1 the value is, the more similar the distributions can be determined to be), it may be determined that the distributions are similar. The calculation of the absolute value of the correlation coefficient makes it possible to evaluate the similarity in both cases where the relationship between high and low luminance levels and the relationship between high and low temperatures are the same or opposite.

$$\Sigma(v(x,y)-v\_\text{ave})*(t(x,y)-t\_\text{ave})/\mathrm{sqrt}(\Sigma(v(x,y)-v\_\text{ave})^2)/ \\ \mathrm{sqrt}(\Sigma(t(x,y)-t\_\text{ave})^2) \qquad \text{Expression (2)}$$

Here, v(x, y) denotes the value of a pixel identified by coordinates (x, y) in the luminance distribution, v_ave denotes the average value of the luminance distribution, t(x, y) denotes the value of a pixel identified by coordinates (x, y) in the temperature distribution, and t_ave denotes the average value of the temperature distribution.

Figure 5A:
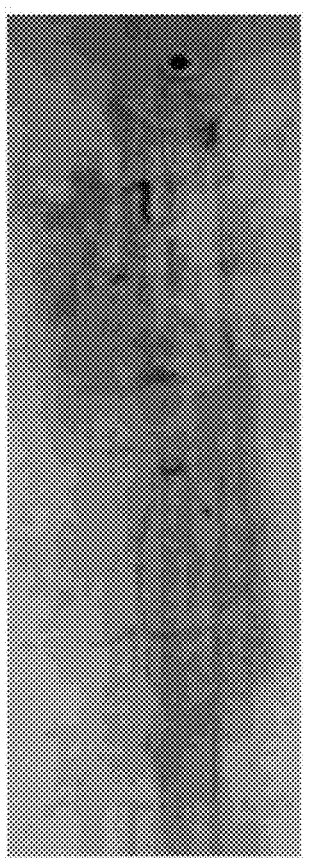
FIGS. 5A and 5B illustrate an infrared thermal image and a visible image that are captured images of a structure with rust fluid adhering thereto.
Figure 5B:
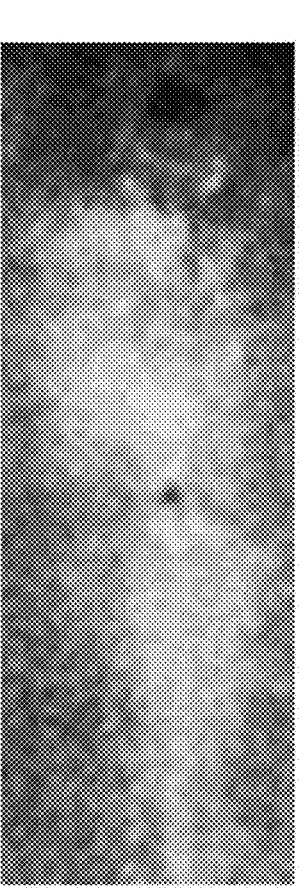

FIGS. 5A and 5B illustrate images of a concrete structure that are captured during the daytime. FIG. 5A illustrates a visible image, and FIG. 5B illustrates an infrared thermal image. In FIGS. 5A and 5B, rust fluid adheres to the surface of the concrete structure to be inspected for which the images are captured.

In this example, in the temperature defect information derivation step (step S3), a temperature defect having a higher surface temperature than the surroundings is determined and extracted from the infrared thermal image (FIG.

5B). Rust fluid appears in the visible image (FIG. 5A) of the area corresponding to the temperature defect, and the luminance distribution thereof and the temperature distribution of the temperature defect are similar (the relationship between high and low luminance levels and the relationship between high and low temperatures are opposite). Thus, the cause of the temperature defect is estimated to be the surface defect (rust fluid).

Figures 6A, 6B:
FIGS. 6A and 6B illustrate binary images representing the shape of a defect in the images in FIGS. 5A and 5B.

In FIGS. 6A and 6B, the shapes of the corresponding defects in the images in FIGS. 5A and 5B are represented by binary values, where a pixel with a defect is represented by 1 (white) and a pixel without a defect is represented by 0 (black). FIG. 6A illustrates the shape of the surface defect (rust fluid) derived from the visible image (FIG. 5A), and FIG. 6B illustrates the shape of the temperature defect derived from the infrared thermal image (FIG. 5B). As a result of comparison between FIG. 6A and FIG. 6B, it is determined that similarity is found.

Figure 7A:
FIGS. 7A and 7B illustrate an infrared thermal image and a visible image that are captured images of a structure including a repaired area.
Figure 7B:
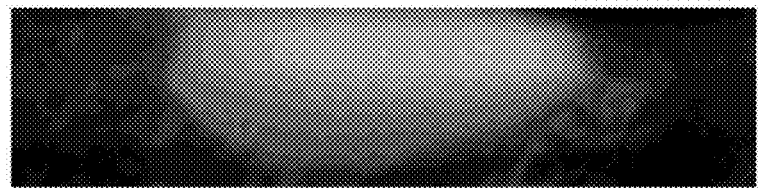

FIGS. 7A and 7B illustrate images of a concrete structure that are captured during the daytime. FIG. 7A illustrates a visible image, and FIG. 7B illustrates an infrared thermal image. The surface of the concrete structure to be inspected for which the images are captured includes a repaired area.

In this example, in the temperature defect information derivation step (step S3), a temperature defect having a higher surface temperature than the surroundings is determined and extracted from the infrared thermal image (FIG. 7B). The repair site appears in the visible image (FIG. 7A) of the area corresponding to the temperature defect, and the luminance distribution thereof and the temperature distribution of the temperature defect are similar (the relationship between high and low luminance levels and the relationship between high and low temperatures are the same). Thus, the cause of the temperature defect is estimated to be the surface defect (repair site).

In FIGS. 8A and 8B, the shapes of the corresponding defects in the images in FIGS. 7A and 7B are represented by binary values, where a pixel with a defect is represented by 1 (white) and a pixel without a defect is represented by 0 (black), as described above. FIG. 8A illustrates the shape of the surface defect (repair site) derived from the visible image (FIG. 7A), and FIG. 8B illustrates the shape of the temperature defect derived from the infrared thermal image (FIG. 7B). As a result of comparison between FIG. 8A and FIG. 8B, it is determined that similarity is found.

In the infrared thermal image of the repair site in FIG. 7B, the temperature gradient is found to be steep at the boundary of the temperature defect. In this manner, a temperature defect caused by a surface defect has a feature of having a steep temperature gradient at the boundary thereof (depending on the type of the surface defect). In the case of an internal defect such as bulging, heat diffuses between the internal defect and the surface. Thus, the temperature gradient at the boundary of the temperature defect due to the internal defect is gentle. The deeper the internal defect is, that is, the farther the distance between the internal defect and the surface is, the more heat diffuses. As a result, the temperature gradient becomes gentle.

In the case of a surface defect, however, the difference in surface temperature between the surface defect and the surroundings, which is caused by a difference in heat absorption rate, thermal conductivity, infrared total emissivity, or the like between the surface defect and the surroundings, is directly imaged. Thus, the gradient of the difference in surface temperature is steeper than that in the case of an internal defect. Accordingly, the cause of the temperature defect may be estimated on the basis of this feature (the feature that the temperature gradient is steep at the boundary of the temperature defect).

Specifically, if the temperature distribution and the luminance distribution are similar over the range corresponding to the temperature defect derived in the temperature defect information derivation step (step S3) or a slightly wider range and/or the temperature gradient at the boundary of the temperature defect is greater than or equal to a predetermined value (a preset threshold value), the cause of the temperature defect may be estimated to be the surface defect.

As the temperature gradient at the boundary of the temperature defect, for example, the maximum gradient at each point on the boundary of the temperature defect, that is, $sqrt((\partial f/\partial x)^2+(\partial f/\partial y)^2)$, which is the magnitude of a gradient vector of f, namely, grad f(x, y)=$\nabla$f(x, y)=$(\partial f/\partial x, \partial f/\partial y)$, where f(x, y) denotes the temperature distribution, is calculated to determine the average value of the maximum gradients at the respective points on the boundary. For example, Expression (3) may be calculated at each point (x, y) on the boundary, and the average value may be determined.

$$sqrt((f(x+1,y)-f(x,y))^2+(f(x,y+1)-f(x,y))^2) \qquad \text{Expression (3)}$$

The temperature gradient at the boundary of the temperature defect greatly changes depending on the thermal environment such as solar radiation or the outside air temperature. Accordingly, the absolute values of temperature differences between the temperature defect and the surroundings, the absolute value of an average temperature difference between the temperature defect and the structure surface in a wide predetermined range including the temperature defect, or the like may be calculated, and the temperature gradient at the boundary may be normalized (for example, divided) by the maximum value, the average value, or the like of the absolute values of the differences. If the normalized temperature gradient is greater than or equal to a predetermined value, the cause of the temperature defect may be estimated to be the surface defect.

In the evaluation of the similarity between the temperature distribution and the luminance distribution for a temperature defect, the evaluation is made also in consideration of the feature that the temperature gradient is steep at the boundary of a temperature defect caused by a surface defect. This feature may be further evaluated in the manner described above. The method described above is an example of the method for evaluating the temperature gradient, which is not limited to the method described above. For example, the temperature gradient can be indirectly evaluated by using a second-order spatial derivative of temperature. Any method may be used to evaluate the temperature gradient.

This feature is particularly noticeable in "repair sites", "joints", and "steps" and is effective for cause estimation.
Peeling FIGS. 9A and 9B and FIGS. 10A and 10B illustrate images of a concrete structure that are captured during the daytime. FIG. 9A illustrates a visible image, and FIG. 9B illustrates an infrared thermal image. FIG. 10A illustrates a visible image, and FIG. 10B illustrates an infrared thermal image. In FIGS. 9A and 9B and FIGS. 10A and 10B, the surface of the concrete structure to be inspected for which the images are captured includes a peeled area.

As illustrated in the visible image in FIG. 9A, it can be understood that peeling occurs in an upper right area and a step is present in the area. As illustrated in the visible image in FIG. 10A, it can be understood that a peeled area is present in a right portion, a small peeled area is also present in a left portion, and steps are present in these areas.

The infrared thermal images in FIG. 9B and FIG. 10B show portions having high surface temperatures (light-colored portions of the infrared thermal image) adjacent to the peeled areas. These portions are considered to be bulges into which air flows through the peeled areas. In areas that are peeled off the surface, accordingly, many portions that are bulges into which air flows through the peeled areas are observed.

The temperature distribution derived in the temperature defect information derivation step (step S3) and the luminance distribution derived in the surface defect information derivation step (step S4) can be used to determine bulging accompanied by peeling (or peeling accompanied by bulging). Specifically, the similarity between the temperature distribution and the luminance distribution is evaluated for the entire temperature defect and a portion of the temperature defect. If no similarity is found for the entire temperature defect but similarity is found for a portion of the temperature defect, bulging accompanied by peeling is determined.

The evaluation of the similarity for the entire temperature defect is performed by extracting a range corresponding to the temperature defect from the luminance distribution and evaluating the similarity between the luminance distribution over this range and the temperature distribution. The evaluation of the similarity for a portion of the temperature defect is performed by extracting a predetermined range centered on each point on the boundary of the temperature defect from the luminance distribution on the basis of the shape of the temperature defect and evaluating the similarity between the luminance distribution over each range and the temperature distribution. If similarity is found in any portion, bulging accompanied by peeling is determined. Since the shape of the boundary (step) of a peeled area in the luminance distribution and the shape of the boundary of a temperature defect in the temperature distribution match, determination can be performed through such evaluation. As described above, the similarity evaluation is performed to cover both a case where the relationship between high and low luminance levels in the luminance distribution and the relationship between high and low temperatures in the temperature distribution are the same and a case where the relationships are opposite.

The infrared thermal images in FIGS. 9B and 10B indicate that the surface temperature of the peeled areas is lower than that of the surroundings. In an image of the same areas that is captured with infrared light during the nighttime, by contrast, the surface temperature of the peeled areas is higher than that of the surroundings. The reason that a peeled area has a different surface temperature from the surroundings in the manner described above is considered to be that the peeled area is located behind the surroundings. In this manner, since a peeled area has a different surface temperature from the surroundings, the peeled area is determined to be a temperature defect and is extracted. A temperature defect caused by peeling can be discriminated from an internal defect such as bulging or other surface defects since the relationship between high and low temperatures with respect to the surroundings is different from that for the internal defect or other surface defects. In addition, an area of peeling in the luminance distribution and a location different from the surroundings in the temperature distribution match. Thus, the temperature distribution and the luminance distribution are clearly similar for the entire temperature defect. Since peeling can be discriminated from other surface defects from a characteristic luminance distribution accompanied by a dark portion, or a low-luminance portion, caused by a step, it can be easily determined that the cause of the temperature defect is peeling. It should be noted that in the case of bulging accompanied by peeling, the temperature defect and the peeling are adjacent to each other and are located at different positions.

As is understood from FIGS. 9A and 9B and FIGS. 10A and 10B, also in the case of bulging accompanied by peeling, like other surface defects, the temperature gradient at the boundary of the temperature defect is steep, and thus this feature can be used for cause estimation. In the case of bulging accompanied by peeling, however, the temperature gradient is steep only in a portion adjacent to the peeling within the boundary of the temperature defect, and the temperature gradient is gentle in the other portions, as in typical bulging. Accordingly, in the case of bulging accompanied by peeling, if the temperature gradient across the entire boundary of the temperature defect is gentle but the temperature gradient across a portion of the boundary is steep, bulging accompanied by peeling is determined.

Specifically, the temperature distribution derived in the temperature defect information derivation step (step S3) and the luminance distribution derived in the surface defect information derivation step (step S4) are used to evaluate the similarity between the temperature distribution and the luminance distribution for the entire temperature defect and a portion of the temperature defect. If no similarity is found for the entire temperature defect but similarity is found for a portion of the temperature defect and if, as a result of evaluation of the gradient of the temperature distribution for the entire boundary of the temperature defect and a portion of the boundary, the gradient for the entire boundary is less than or equal to a predetermined value but the gradient for a portion of the boundary is greater than or equal to the predetermined value, the cause of the temperature defect may be estimated to be bulging accompanied by peeling. As in the case of other surface defects, the temperature gradient for the entire boundary of the temperature defect is determined by determining the maximum gradient, that is, the size of the gradient vector of the temperature distribution, at each point on the boundary of the temperature defect and determining the average value thereof (the average value of the maximum gradients at all points on the boundary of the temperature defect). The temperature gradient for a portion of the boundary of the temperature defect is determined by extracting a predetermined range centered on each point on the boundary and determining the average value of the maximum gradients at all points on the boundary included in the extracted predetermined range.

In the temperature distribution of the temperature defect, a portion similar to the luminance distribution is the same as a portion having a steep temperature gradient at the boundary. That is, in the temperature distribution of the temperature defect, the temperature distribution and the luminance distribution are similar and the temperature gradient at the boundary is steep in a portion adjacent to the peeling. Accordingly, in a preferred method, evaluation of the similarity to the luminance distribution and evaluation of the temperature gradient are performed simultaneously for each portion of the temperature defect, and if a portion similar to the luminance distribution and having a steep temperature gradient is present, the cause of the temperature defect is estimated to be bulging accompanied by peeling.

Also in the case of bulging accompanied by peeling, as in the case of other surface defects, the temperature gradient may be normalized by using the absolute values of temperature differences between the temperature defect and the surroundings, the absolute value of an average temperature difference between the temperature defect and a wider range of the structure surface, or the like. Also in the case of bulging accompanied by peeling, as in the case of other surface defects, in the evaluation of the similarity to the luminance distribution, the evaluation is made also in consideration of the feature that the temperature gradient is steep at the boundary. However, the temperature gradient may be further evaluated in the manner described above.

Figure 12A:
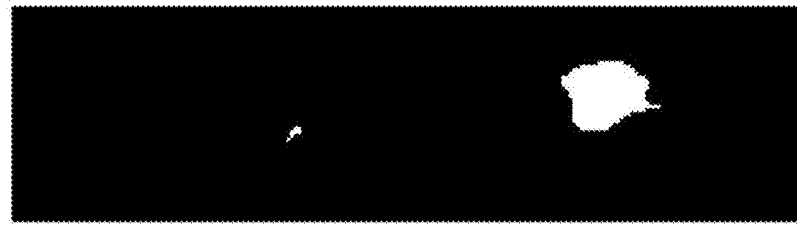
FIGS. 12A and 12B illustrate binary images representing the shape of a defect in the images in FIGS. 10A and 10B.
Figure 12B:

In FIGS. 11A and 11B, the shapes of the corresponding defects in the images in FIGS. 9A and 9B are represented by binary values. In FIGS. 12A and 12B, the shapes of the corresponding defects in the images in FIGS. 10A and 10B are represented by binary values. A pixel with a defect is represented by 1 (white), and a pixel without a defect is represented by 0 (black). FIG. 11A illustrates the shape of the surface defect (peeling) derived from the visible image (FIG. 9A), and FIG. 11B illustrates the shape of the temperature defect derived from the infrared thermal image (FIG. 9B).

As illustrated in FIGS. 11A and 11B, as a result of comparison, FIGS. 11A and 11B are not similar as a whole. However, an upper right area of the temperature defect is adjacent to the peeling, and the shape of the temperature defect and the shape of the boundary of the peeling are similar in the portion adjacent to the peeling. Thus, bulging accompanied by peeling can be estimated.

FIG. 12A illustrates the shape of the surface defects (peelings) derived from the visible image (FIG. 10A), and FIG. 12B illustrates the shape of the temperature defects derived from the infrared thermal image (FIG. 10B).

As illustrated in FIGS. 12A and 12B, as a result of comparison between FIGS. 12A and 12B, in addition to peeling in a right portion, peeling is also present in a small portion to the left of the peeling in the right portion. Both peelings are adjacent to the temperature defects and have similar shapes to the temperature defects in the adjacent portions. Thus, both of the two temperature defects can be estimated to be bulging accompanied by peeling.

Crack

Figure 13A:
FIGS. 13A and 13B illustrate an infrared thermal image and a visible image that are captured images of a structure including a cracked area.
Figure 13B:
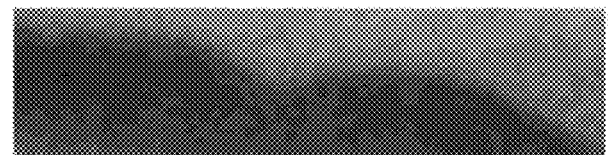
Figure 14A:
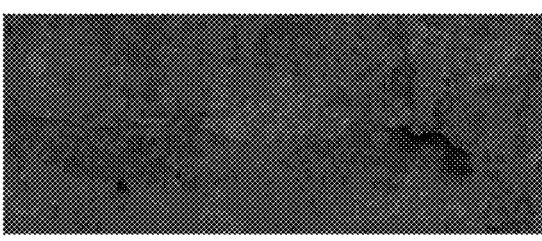
FIGS. 14A and 14B illustrate an infrared thermal image and a visible image that are captured images of a structure including another cracked area.
Figure 14B:
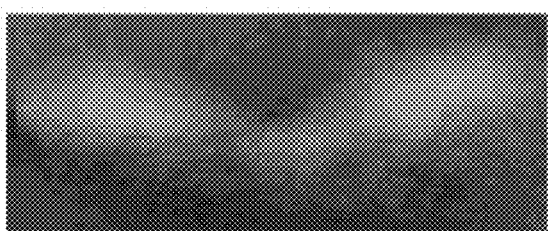

FIGS. 13A and 13B and FIGS. 14A and 14B illustrate images of a concrete structure that are captured during the daytime. FIG. 13A illustrates a visible image, and FIG. 13B illustrates an infrared thermal image. FIG. 14A illustrates a visible image, and FIG. 14B illustrates an infrared thermal image. In FIGS. 13A and 13B and FIGS. 14A and 14B, the surface of the concrete structure to be inspected for which the images are captured includes a cracked area.

From the visible image in FIG. 13A, it can be understood that a crack lies horizontally. From the infrared thermal image in FIG. 13B, it can be understood that the surface temperature is high in a portion above the crack (a light-colored portion in the infrared thermal image). The portion having a high surface temperature is a bulge. As illustrated in FIGS. 13A and 13B, many bulging portions are observed to be accompanied by cracks. In many cases, cracks lie in portions of the boundaries of the bulging portions so as to extend along the boundaries. As illustrated in FIGS. 14A and 14B, a crack lying in the range of a bulging region is also observed in some cases.

The temperature distribution derived in the temperature defect information derivation step (step S3) and the luminance distribution derived in the surface defect information derivation step (step S4) can be used to determine bulging accompanied by a crack (or a crack accompanied by bulging). First, known edge detection is performed on the temperature distribution to extract the boundary of a temperature defect. Various known methods are available for edge detection, examples of which include the Sobel method, the Laplacian method, and the Canny method. Then, on the basis of the shape of the temperature defect, a luminance distribution over a predetermined range centered on each point on the boundary of the temperature defect and a boundary-extracted distribution of the temperature defect are extracted, and the similarity is evaluated. If similarity is found in any portion on the boundary, it is determined that a crack lies along the boundary in the portion, that is, bulging accompanied by a crack is determined.

As illustrated in FIGS. 14A and 14B, also for a crack lying in a bulging range, determination can be performed in the following way. As can be understood from FIGS. 14A and 14B, a rapid temperature change occurs in a cracked portion within the bulging range. Accordingly, if a distribution obtained by performing edge detection on the temperature distribution has a linear portion, which is extracted as an edge, not only at the boundary of the temperature defect but also within the temperature defect and the shape of the linear portion matches the shape of a crack in the luminance distribution, bulging accompanied by a crack is determined.

Specifically, on the basis of the shape of the temperature defect, a luminance distribution over a predetermined range centered on each point within the temperature defect and an edge-extracted distribution of the temperature defect are extracted, and the similarity is evaluated. If similarity is found in at least a portion within the temperature defect, a crack lying within the temperature defect, that is, bulging accompanied by a crack, is determined. As described above, the evaluation of the similarity is performed so as to cover both cases where the relationships between high and low values in two distributions to be evaluated are the same and opposite. Alternatively, the similarity may be evaluated in consideration of the fact that the luminance of a crack is lower than that of the surroundings in the luminance distribution.

Also in the case of bulging accompanied by a crack, as in the case of peeling, the temperature gradient at some boundaries is steeper than that in a temperature defect caused by an internal defect such as bulging. That is, the temperature gradient is steep in a portion having a crack along the boundary of the temperature defect. The temperature gradient is also steep in a portion having a crack within the temperature defect. Accordingly, these features may also be used to determine bulging accompanied by a crack. For example, edge detection is performed on the temperature distribution to extract portions having a steep temperature change at the boundary of a temperature defect and within the temperature defect. Then, among the portions, a portion having an edge size greater than or equal to a predetermined value, that is, a portion having a steep temperature gradient greater than or equal to a predetermined value, is extracted. If a portion having a temperature gradient greater than or equal to the predetermined value is not present at the boundary of a temperature defect or within the temperature defect, the cause of the temperature defect is estimated to be a factor other than bulging accompanied by a crack. For example, the cause of the temperature defect is estimated to be an internal defect such as bulging. If a portion having a temperature gradient greater than or equal to the predetermined value is present, the similarity between each of the respective portions and the luminance distribution may be evaluated, and if similarity is found in any portion (if a linear portion having a steep temperature gradient is present and the shape of the linear portion matches the shape of a crack in the luminance distribution), the cause of the temperature defect may be estimated to be bulging accompanied by a crack.

Also in the case of bulging accompanied by a crack, as in the case of other surface defects and bulging accompanied by peeling, the temperature gradient may be normalized by using the absolute values of temperature differences between the temperature defect and the surroundings, the absolute value of an average temperature difference between the temperature defect and a wider range of the structure surface, or the like. In the evaluation of the similarity between the distribution obtained by performing edge detection on the temperature distribution and the luminance distribution, the evaluation is made also in consideration of the feature that the temperature gradient of the temperature distribution is steep in a portion having a crack. However, the temperature gradient may be further evaluated in the manner described above.

As described above, a typical visible image is composed of RGB images. Any of the RGB luminance distributions may be used to perform cause estimation. However, preferably, the magnitude of luminance variation is evaluated in the luminance distribution of each of the RGB channels, and the channel having the largest variation is used for cause estimation. The same applies to the use of two types or four or more types of visible images.

Figure 15A:
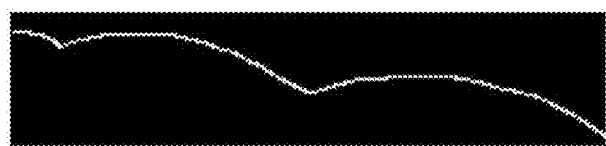
FIGS. 15A and 15B illustrate binary images representing the shape of a defect in the images in FIGS. 13A and 13B.
Figure 15B:
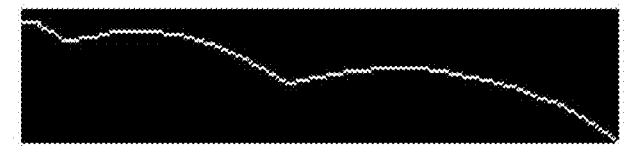
Figures 16A, 16B:
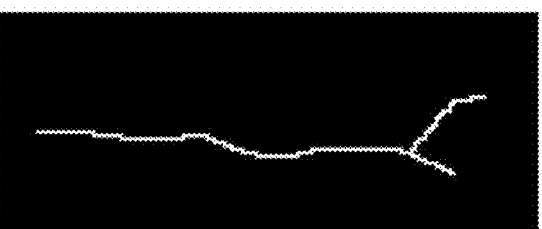
FIGS. 16A and 16B illustrate binary images representing the shape of a defect in the images in FIGS. 14A and 14B.

In FIGS. 15A and 15B, the shapes of the corresponding defects in the images in FIGS. 13A and 13B are represented by binary values. In FIGS. 16A and 16B, the shapes of the corresponding defects in the images in FIGS. 14A and 14B are represented by binary values. A pixel with a defect is represented by 1 (white), and a pixel without a defect is represented by 0 (black).

FIG. 15A illustrates the shape of the surface defect (crack) derived from the visible image (FIG. 13A), and FIG. 15B illustrates the shape of the boundary of a temperature defect derived from the infrared thermal image (FIG. 13B). As illustrated in FIGS. 15A and 15B, the shape of the surface defect (crack) in FIG. 15A and the shape of the boundary of the temperature defect in FIG. 15B are at least partially similar. Thus, bulging accompanied by a crack can be estimated.

FIG. 16A illustrates the shape of the surface defect (crack) derived from the visible image (FIG. 14A), and FIG. 16B illustrates the shape of an edge (portion with rapid temperature change) within a temperature defect derived from the infrared thermal image (FIG. 14B). While the boundary of the temperature defect is also extracted as an edge in FIG. 16B, the illustration of the boundary is omitted. The shape of the surface defect (crack) in FIG. 16A and the shape of the edge within the temperature defect in FIG. 16B are at least partially similar. Thus, bulging accompanied by a crack can be estimated.

The flow of estimation of the causes of a crack, peeling, and other surface defects will be described. The order of estimation of the causes of a crack, peeling, and other surface defects is not limited. In an example, the flow of estimation of the causes of other surface defects, peeling, and a crack in this order will be described.

First, a range corresponding to the temperature defect derived in the temperature defect information derivation step (step S3) is extracted from the luminance distribution derived in the surface defect information derivation step (step S4), and the similarity between the luminance distribution over this range and the temperature distribution is evaluated. At this time, the temperature gradient at the boundary of the temperature defect may be evaluated.

If similarity is found (and/or if the temperature gradient at the boundary is steep), the cause of the temperature defect is estimated to be the surface defect. Further, it may be determined whether the surface defect is peeling or any other surface defect on the basis of the relationship of the temperature difference between the temperature defect and the surroundings.

If no similarity is found (and/or if the temperature gradient at the boundary is gentle), the process proceeds to the subsequent step.

Then, in the luminance distribution derived in the surface defect information derivation step (step S4), a predetermined range centered on each point on the boundary of the temperature defect derived in the temperature defect information derivation step (step S3) is extracted, and the similarity between the luminance distribution over each range and the temperature distribution is evaluated. At this time, the temperature gradient at the boundary of the temperature defect over each range may be evaluated.

If similarity is found in any portion (and if the temperature gradient at the boundary is steep), the cause of the temperature defect is estimated to be bulging accompanied by peeling. If no similarity is found in any portion (or if the temperature gradient at the boundary is gentle), the process proceeds to the subsequent step.

Then, edge detection is performed on the temperature distribution of the temperature defect derived in the temperature defect information derivation step (step S3). In the luminance distribution derived in the surface defect information derivation step (step S4), a predetermined range centered on each point on the boundary and within the temperature defect derived in the temperature defect information derivation step (step S3) is extracted, and the similarity between the luminance distribution over each range and the temperature distribution on which edge detection is performed is evaluated. At this time, only a portion having an edge size greater than or equal to a predetermined value may be extracted from the temperature distribution on which edge detection is performed.

If similarity is found in any portion, the cause of the temperature defect is estimated to be bulging accompanied by a crack. If no similarity is found, bulging is estimated.

It is also possible to perform cause estimation after the presence or absence, type, shape, position, and luminance distribution of a crack, peeling, or any other surface defect are explicitly derived from the luminance distribution of an area corresponding to a temperature defect. This method is the same as the method for cause estimation after the presence or absence, type, and the like of a surface defect are explicitly derived in the surface defect information derivation step (step S4), and the description thereof will thus be omitted.

Second Aspect

In a second aspect, a description will be given of a case where in the surface defect information derivation step (step S4), the presence or absence, type, shape, position, and luminance distribution of a surface defect are explicitly derived from the luminance distribution of an area corresponding to a temperature defect, and the types of the other surface defects are not identified. A method for estimating the causes of a crack, peeling, and other surface defects will be described.

Other Surface Defects

If no other surface defect is present, the cause of the temperature defect is estimated to be a factor other than the surface defect, for example, an internal defect such as bulging. If any other surface defect is present, the similarity between the luminance distribution and the temperature distribution is evaluated for the surface defect by using a method similar to that described in the first aspect. If similarity is found, the cause of the temperature defect is estimated to be the surface defect. If no similarity is found, the cause of the temperature defect is estimated to be a factor other than the surface defect, for example, an internal defect such as bulging. Since the shape of the other surface defect has already been derived, the similarity may be evaluated over a range including both the range of this surface defect and the range corresponding to the temperature defect derived in the temperature defect information derivation step (step S3). Alternatively, on the basis of not the temperature distribution and the luminance distribution but the shape, the similarity between a binary distribution with 1 representing a pixel having a temperature defect and 0 representing a pixel having no temperature defect and a binary distribution with 1 representing a pixel having any other surface defect and 0 representing a pixel having no surface defect may be evaluated.

As described in the first aspect, a temperature defect caused by any other surface defect has a feature of having a steeper temperature gradient at the boundary thereof than a temperature defect caused by an internal defect. Thus, this feature may be used to estimate the cause of the temperature defect. This method has been described in the first aspect, and the description thereof will thus be omitted.

Peeling

If no peeling is present, the cause of the temperature defect is estimated to be a factor not accompanied by peeling, for example, an internal defect such as bulging not accompanied by peeling. If peeling is present, the position and shape of the temperature defect derived in the temperature defect information derivation step (step S3) are compared with the position and shape of the peeling. If the positions of the temperature defect and the peeling are different and adjacent and the shapes of the boundaries are partially similar, the cause of the temperature defect is estimated to be bulging accompanied by peeling.

For example, for a binary distribution with 1 representing a pixel having a temperature defect and 0 representing a pixel having no temperature defect and a binary distribution with 1 representing a pixel having peeling and 0 representing a pixel having no peeling, a predetermined range centered on each point on the boundary of the temperature defect is extracted on the basis of the shape of the temperature defect, and the similarity between a temperature defect shape distribution (binary distribution with 1 representing a pixel having a temperature defect and 0 representing a pixel having no temperature defect) and a peeling shape distribution (binary distribution with 1 representing a pixel having peeling and 0 representing a pixel having no peeling) over each range is evaluated. If similarity is found in any portion, bulging accompanied by peeling is estimated. Alternatively, if the positions of the temperature defect and the peeling are different and adjacent and the temperature distribution of the temperature defect and the luminance distribution of the peeling are similar in a portion of the boundary of the temperature defect, a temperature distribution and a luminance distribution over a predetermined range centered on each point on the boundary of the temperature defect may be extracted on the basis of, for example, the shape of the temperature defect, and the similarity between the temperature distribution and the luminance distribution over each range may be evaluated. If similarity is found in any portion, bulging accompanied by peeling may be estimated. Alternatively, if the peeling is outside the size of the temperature defect derived in the temperature defect information derivation step (step S3) and the boundary of the peeling is located in the vicinity of the boundary of the size of the temperature defect, bulging accompanied by peeling may be estimated.

As described in the first aspect, a temperature defect caused by bulging accompanied by peeling has a steep temperature gradient in a portion adjacent to the peeling within the boundary of the temperature defect. Accordingly, the similarity between the shape or temperature distribution of the temperature defect and the shape or luminance distribution of the peeling may be evaluated over a predetermined range centered on each point on the boundary of the temperature defect, and the temperature gradient at the boundary of the temperature defect in the predetermined range may be evaluated. If the shape or temperature distribution of the temperature defect and the shape or luminance distribution of the peeling are similar in any portion and/or a portion having a steep temperature gradient is present, bulging accompanied by peeling may be estimated. Alternatively, if the peeling is outside the size of the temperature defect, the boundary of the peeling is located in the vicinity of the boundary of the size of the temperature defect, and the temperature gradient of the temperature defect is steep in the vicinity of the boundary, bulging accompanied by peeling may be estimated.

As described in the first aspect, the temperature gradient may be normalized.

Crack

If no crack is present, the cause of the temperature defect is estimated to be a factor not accompanied by a crack, for example, an internal defect such as bulging not accompanied by a crack. If a crack is present, the similarity between the shape of the temperature defect derived in the temperature defect information derivation step (step S3), that is, the shape of the boundary, and the shape of the crack is evaluated. If similarity is found in any portion on the boundary of the temperature defect, it is estimated that a crack lies along the boundary in the portion, that is, bulging accompanied by a crack is estimated. The similarity is evaluated in the following way, for example. For a distribution with 1 representing pixels at the boundary of the temperature defect and 0 representing the other pixels and a distribution with 1 representing a pixel having a crack and 0 representing a pixel having no crack, a predetermined range centered on each point on the boundary of the temperature defect is extracted. Then, the evaluation is performed by evaluating the similarity between the temperature defect boundary shape distribution over each range, that is, a distribution with 1 representing pixels at the boundary of the temperature defect and 0 representing the other pixels, and the crack shape distribution, that is, a distribution with 1 representing a pixel having a crack and 0 representing a pixel having no crack. Alternatively, the similarity between a distribution obtained by performing edge detection on the temperature distribution of the temperature defect and the luminance distribution of a crack may be evaluated. If similarity is found in any portion on the boundary of the temperature defect, it may be estimated that a crack lies along the boundary in the portion, that is, bulging accompanied by a crack may be estimated. If a crack is present within the temperature defect derived in the temperature defect information derivation step (step S3), bulging accompanied by a crack is estimated. Alternatively, if a crack is present in the vicinity of the boundary or within the size of the temperature defect derived in the temperature defect information derivation step (step S3), bulging accompanied by a crack may be estimated.

As described in the first aspect, a temperature defect caused by bulging accompanied by a crack has a steep temperature gradient in a portion having a crack along the boundary of the temperature defect and in a portion having a crack within the temperature defect. Accordingly, the similarity between a distribution obtained by performing edge detection on the shape or temperature distribution of the temperature defect over a predetermined range centered on each point on the boundary of the temperature defect and the shape or luminance distribution of a crack may be evaluated, and the temperature gradient at the boundary of the temperature defect in the predetermined range, for example, the size of a detected edge, may be evaluated. If the distribution obtained by performing edge detection on the shape or temperature distribution of the temperature defect and the shape or luminance distribution of the crack are similar in any portion and/or a portion having a steep temperature gradient is present, bulging accompanied by a crack may be estimated. If a crack is present within the temperature defect, the temperature gradient of the temperature distribution in the portion of the crack may be evaluated. If the temperature gradient is steep in the portion of the crack, bulging accompanied by a crack may be estimated. At this time, the similarity between the distribution obtained by performing edge detection on the temperature distribution and the shape or luminance distribution of the crack in a predetermined range including the portion of the crack may also be evaluated. If similarity is found and/or the temperature gradient is steep, bulging accompanied by a crack may be estimated.

As described in the first aspect, the temperature gradient may be normalized.

The flow of estimation of the causes of a crack, peeling, and other surface defects will be described. The order of estimation of the causes of a crack, peeling, and other surface defects is not limited. In an example, the flow of estimation of the causes of other surface defects, peeling, and a crack in this order will be described.

First, the presence or absence of other surface defects derived in the surface defect information derivation step (step S4) and, if any, the similarity between the surface defect and the temperature defect derived in the temperature defect information derivation step (step S3) are evaluated. At this time, the temperature gradient at the boundary of the temperature defect may be evaluated.

If no other surface defects are present or no similarity is found (and/or if the temperature gradient at the boundary is gentle), the process proceeds to the subsequent step.

If similarity is found (and/or if the temperature gradient at the boundary is steep), the cause of the temperature defect is estimated to be any other surface defect.

Then, the presence or absence of peeling derived in the surface defect information derivation step (step S4) and, if any, the partial similarity or positional relationship between the peeling and the temperature defect derived in the temperature defect information derivation step (step S3) are evaluated. At this time, the temperature gradient at the boundary of the temperature defect in each portion may be evaluated.

If no peeling is present or no similarity is found in any portion (and/or if the temperature gradient at the boundary is gentle), the process proceeds to the subsequent step.

If similarity is found in any portion (and/or if the temperature gradient at the boundary is steep), the cause of the temperature defect is estimated to be bulging accompanied by peeling.

Then, the presence or absence or the positional relationship of a crack derived in the surface defect information derivation step (step S4) (the presence or absence of a crack in the vicinity of the boundary of the temperature defect or within the temperature defect is evaluated) is evaluated. If a crack is present, the partial similarity between the crack and the boundary or the inside of the temperature defect derived in the temperature defect information derivation step (step S3) is evaluated. At this time, the temperature gradient of the temperature defect in each portion may be evaluated.

If no crack is present in the vicinity of the temperature defect boundary or if a crack is present in the vicinity of the temperature defect boundary but none of the portions of the temperature defect boundary is similar to the crack (and/or if the temperature gradient at the boundary is gentle) and if no crack is present within the temperature defect (or if a crack is present within the temperature defect but the distribution obtained by performing edge detection on the temperature distribution in the crack portion is not similar to the crack and/or if the temperature gradient in the portion of the crack is gentle), the cause of the temperature defect is estimated to be bulging.

If a crack is present in the vicinity of the temperature defect boundary and any portion of the temperature defect boundary is similar to the crack (and/or if the temperature gradient at the boundary is steep) or if a crack is present within the temperature defect (and if the crack is similar to a distribution obtained by performing edge detection on the temperature distribution in the crack portion and/or if the temperature gradient in the portion of the crack is steep), the cause of the temperature defect is estimated to be bulging accompanied by a crack.

Third Aspect

In a third aspect, a description will be given of a case where in the surface defect information derivation step (step S4), the presence or absence, type, shape, position, and luminance distribution of a surface defect are explicitly derived from the luminance distribution of an area corresponding to a temperature defect, and further the type of any other surface defect is identified.

The cause estimation method for a crack and peeling is the same as that in the second aspect, and only the cause estimation method for other surface defects is different from that in the second aspect.

As described above, information effective for cause estimation differs depending on the type of surface defect in the following way.

For a surface defect in which a difference in the amount of absorbed visible light from the concrete surface is a main cause of a difference in surface temperature, such as color unevenness, rust fluid, or rust, the luminance distribution is effective for cause estimation as surface defect information.

For a surface defect in which a difference in thermal conductivity or infrared emissivity from the concrete surface is a main cause of a difference in surface temperature, such as a repair site or free lime, or a surface defect in which a difference in surface temperature occurs due to a structural factor, such as a joint or a step, the shape is effective for cause estimation as surface defect information.

It can be understood that, for example, the luminance distribution is effective to estimate the cause of rust fluid in FIGS. 5A and 5B, whereas, for the repair site in FIGS. 7A and 7B, the luminance distribution over the repair site surface is noise and only the shape is more effective. In the third aspect, accordingly, the cause of other surface defects is estimated by basically using the same method as that in the second aspect. However, surface defect information to be used to evaluate similarity is selected depending on the type of surface defect. Specifically, the luminance distribution or the shape is selected.

As described in the first aspect, a temperature defect caused by a surface defect has a steeper temperature gradient at the boundary than a temperature defect caused by an internal defect. However, some surface defects, such as rust fluid illustrated in FIGS. 5A and 5B, have a temperature gradient that is not always steep at the boundary. Accordingly, in a preferred method, whether to evaluate the temperature gradient at the boundary of a temperature defect is switched according to the type of surface defect, and the temperature gradient is not evaluated for a surface defect having a temperature gradient that is not always steep at the boundary, such as rust fluid.

Estimation Result Display Step

The information display unit 61 displays the estimation result of the cause of the temperature defect on the display device 30 via the display control unit 26 (estimation result display step: step S6).

The cause of each temperature defect determined and extracted in the temperature defect information derivation step (step S3), which is estimated in the cause estimation step (step S5), is displayed. The cause may be displayed near each temperature defect in the infrared thermal image, or may be displayed together with the position and shape of the temperature defect in the visible image. The cause may be displayed on any images obtained by processing the infrared thermal image and the visible image and/or on any other images. In the third aspect (in a case where the types of other surface defects are identified), if the cause estimated in the cause estimation step (step S5) is "any other surface defect", the type (such as color unevenness, joints, steps, or rust fluid) is preferably displayed.

Figure 17:
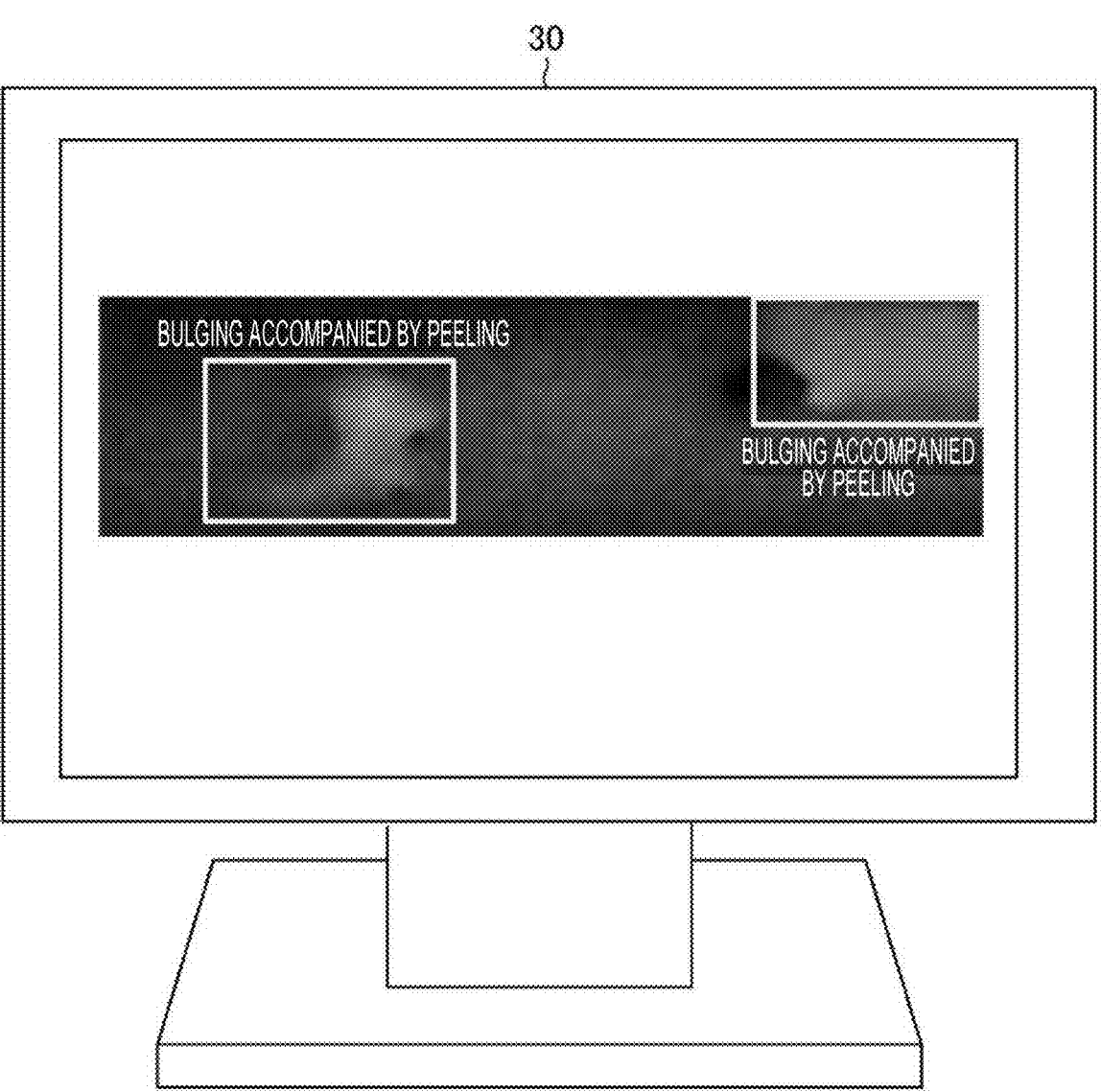
FIG. 17 is a diagram illustrating an example of a display result obtained by displaying estimation results on a display device.

FIG. 17 is a diagram illustrating an example of a display result obtained by displaying estimation results on the display device 30. In FIG. 17, an infrared thermal image corresponding to FIG. 10B is displayed. Further, an area determined to be a temperature defect and extracted in the temperature defect information derivation step (step S3) is displayed surrounded by a white frame, and the cause "bulging accompanied by peeling", which is estimated in the cause estimation step (step S5), is displayed in white text near the white frame.

In FIG. 17, only a portion of the infrared thermal image is displayed. Alternatively, the entire infrared thermal image that is captured may be displayed, and the cause of each area determined to be a temperature defect in the infrared thermal image and extracted may be displayed, or a wider range may be displayed.

The example in FIG. 17 is merely an example, and the text may be displayed on a white background to make the cause "bulging accompanied by peeling" easily visible. Many variations in how to show the cause "bulging accompanied by peeling" are available, and no particular limitation is imposed thereon.

Other Aspects

A difference in structure surface temperature caused by an internal factor of a concrete structure, such as bulging, may be buried under a difference in structure surface temperature caused by a surface defect, and it may be difficult to identify the temperature difference caused by the internal factor of the structure. For example, a peeled area on a concrete surface is filled and patched with a repair material. In some cases, the repair material may bulge out from the original concrete structure after several years. Desirably, the temperature difference caused by the bulging can be identified. However, the temperature difference caused by the bulging may be unidentifiable because it is buried under the temperature difference caused by the difference in thermal conductivity or infrared emissivity between the repair material and the surrounding concrete surface.

Even in this case, to identify the temperature difference caused by an internal factor of the structure, if the cause of the temperature defect is estimated to be any other surface defect, a temperature distribution caused by the surface defect may be estimated on the basis of the temperature defect information and the surface defect information and may be reduced from the original temperature distribution. Various methods this purpose are available.

For example, the luminance distribution of the surface defect, which is the surface defect information, may be subjected to predetermined blurring processing (the temperature distribution caused by the surface defect is more blurred than the luminance distribution due to factors such as heat conduction). The contrast of the blurred luminance distribution may be adjusted to optimize the luminance distribution to best match the original temperature distribution. The luminance distribution whose contrast is optimized may be estimated as the temperature distribution caused by the surface defect and may be subtracted from or divided by the original temperature distribution.

However, a method for estimating a temperature distribution caused by a surface defect from the luminance distribution of the surface defect, as in this method, is not suitable for a surface defect whose luminance distribution and temperature distribution are not similar. That is, as described above, this method is suitable for a surface defect such as color unevenness, rust fluid, or rust in which a difference in the amount of absorbed visible light from the concrete surface is a main cause of a temperature difference.

On the other hand, this method is not suitable for a surface defect such as a repair site or free lime in which a difference in thermal conductivity or infrared emissivity from the concrete surface is a main cause of a temperature difference or for a surface defect such as a joint or a step in which a temperature difference occurs due to a structural factor. For such a surface defect, the temperature distribution is preferably estimated without using the luminance distribution of the surface defect. For example, various thermal parameters related to the surface defect may be set in accordance with the type of the surface defect, thermal simulation (simulation including heat conduction, heat radiation, and convection) may be performed on the basis of the parameters and the shape of the surface defect to simulate a temperature distribution. The temperature distribution of the simulation that best matches the original temperature distribution may be estimated to be the temperature distribution caused by the surface defect and may be subtracted from or divided by the original temperature distribution.

For a surface defect such as a repair site or free lime in which the thermal conductivity or the infrared emissivity is a main cause of a temperature difference, the thermal conductivity or the infrared emissivity is set as a particularly important parameter. For a surface defect such as a joint or a step in which a temperature difference occurs due to a structural factor, a structure parameter such as the depth or height of irregularities of the joint or the height of the step is set as a particularly important parameter.

A temperature distribution approximating the original temperature distribution by a lower-order mathematical expression, for example, a temperature distribution that is represented by a low-order polynomial expression such as a linear expression (flat plane) or a second-order expression (curved plane) and that best matches the original temperature distribution, may be simply estimated to be the temperature distribution caused by a surface defect and may be subtracted from the original temperature distribution. A distribution obtained by subjecting the original temperature distribution to predetermined blurring processing may be estimated as the temperature distribution caused by a surface defect and may be subtracted from the original temperature distribution.

The foregoing description of the embodiment described above is direction to a method in which the step of determining a temperature defect and deriving temperature defect information in the temperature defect information derivation step (step S3), the step of deriving surface defect information in the surface defect information derivation step (step S4), and the step of estimating a cause in the cause estimation step (step S5) are performed by using a rule-based approach.

This is not limiting, and the temperature defect information derivation step (step S3), the surface defect information derivation step (step S4), and the cause estimation step (step S5) can also be implemented by using various machine learning methods.

For example, in the temperature defect information derivation step (step S3), a temperature defect can be determined from an infrared thermal image and information including the shape thereof can be derived by using a machine learning method for detecting an object from an image and extracting a region of the object, such as FCN (Fully Convolutional Network), SegNet (A Deep Convolutional Encoder-Decoder Architecture for Image Segmentation), or U-Net (Convolutional Networks for Biomedical Image Segmentation).

The same machine learning method can also be used as the method for deriving surface defect information from a visible image in the surface defect information derivation step (step S4). In the case of a visible image, when a plurality of types of images such as RGB images are present, all the types of visible images are input.

In the temperature defect information derivation step (step S3), a machine learning method such as R-CNN (Regions with CNN (Convolutional Neural Network) features), Fast R-CNN, Yolo (You only look once), or SSD (Single Shot MultiBox Detector) can also be used for determining a temperature defect and deriving the size thereof.

In the surface defect information derivation step (step S4), first, a surface defect is determined, and a feature value (feature value such as average luminance, shape, texture of the luminance distribution, contrast of the luminance distribution, or frequency spectrum of the luminance distribution) is extracted from the luminance distribution. The type of the surface defect (other surface defects, peeling, or a crack, and the types of the other surface defects, such as color unevenness, joints, steps, and rust fluid) can be determined from the feature value by using a machine learning method for classifying an object from the feature value, such as logistic regression, linear discrimination analysis, the K-nearest neighbor method, a decision tree (classification tree), a random forest, or a support vector machine (SVM).

In the cause estimation step (step S5), the method for estimating the cause of the temperature defect from the temperature defect information and the surface defect information can also be implemented by using various machine learning methods in accordance with the form of the temperature defect information and the surface defect information. For example, when a temperature distribution of a temperature defect is input as the temperature defect information and a luminance distribution of an area corresponding to the temperature defect is input as the surface defect information, a machine learning method such as DNN (Deep Neural Network) or CNN can be used to classify the cause of the temperature defect into "other surface defects (such as "color unevenness", "joints", "steps", or "rust fluid" when the types of the other surface defects are also to be classified)", "bulging accompanied by peeling", "bulging accompanied by a crack", "bulging", or the like.

All of the temperature defect information derivation step (step S3), the surface defect information derivation step (step S4), and the cause estimation step (step S5) can be collectively implemented by using a single machine learning method. That is, when an infrared thermal image and a visible image (if a plurality of types of images such as RGB images are present, all the types of visible images) are input, the machine learning method such as FCN, SegNet, U-Net, R-CNN, Fast R-CNN, Yolo, or SSD described above can be used to detect a temperature defect and classify the cause thereof. To execute machine learning, it is preferable that a large amount of training data be prepared.

The foregoing description of the embodiment described above is directed to an example implementation in which cause estimation is performed sequentially for each of other surface defects, peeling, and a crack, and one cause is estimated as the cause of a temperature defect. A plurality of candidates may be estimated as causes of the temperature defect. That is, cause estimation may be performed for each of other surface defects, peeling, and a crack, or a plurality of candidates such as other surface defects, bulging accompanied by peeling, and bulging accompanied by a crack may be estimated as causes of the temperature defect.

Alternatively, causes may be estimated probabilistically rather than alternatively. For example, if each of other surface defects, peeling, and a crack is not located in an area corresponding to a temperature defect in a visible image, the probability of being the cause of the temperature defect is 0%. If each of other surface defects, peeling, and a crack is located in an area corresponding to a temperature defect in a visible image, the probability of being the cause of the temperature defect may be a value obtained by converting a calculated value of the similarity between the luminance distribution and/or shape thereof and the temperature distribution and/or shape of the temperature defect (or a distribution obtained by performing edge detection) into a probability.

Alternatively, a value converted into a probability may be employed, including calculated values of the temperature gradient at the boundary of the temperature defect and within the temperature defect. In the example implementation described above, in the estimation result display step (step S6), a plurality of candidates estimated as causes of each temperature defect determined and extracted in the temperature defect information derivation step (step S3) and the probabilities thereof are displayed.

The program according to the embodiment described above may be implemented as a dedicated analysis program, or may be implemented by using any apparatus. For example, the program according to the embodiment described above can also be implemented by using a personal computer. Apparatuses or programs for implementing the steps may be integrated into a single unit or separated from each other.

Others

In the embodiment described above, the hardware structure of a processing unit that executes various types of processing is implemented as the following various processors. The various processors include a CPU (Central Processing Unit) that is a general-purpose processor executing software (program) to function as various processing units, a Programmable Logic Device (PLD) that is a processor whose circuit configuration can be changed after manufacturing, such as an FPGA (Field Programmable Gate Array), a dedicated electric circuit that is a processor having a circuit configuration designed specifically for executing specific processing, such as an ASIC (Application Specific Integrated Circuit), and so on.

A single processing unit may be constituted by one of the various processors, or may be constituted by two or more processors of the same type or different types (for example, a plurality of FPGAs or a combination of a CPU and an FPGA). A plurality of processing units can be configured as a single processor. In examples of configuring a plurality of processing units as a single processor, first, as typified by a computer such as a client or server computer, one or more CPUs and software are combined to configure a single processor, and the processor functions as the plurality of processing units. The examples include, second, a form in which, as typified by a system on chip (SoC) or the like, a processor is used in which the functions of the entire system including the plurality of processing units are implemented as one IC (Integrated Circuit) chip. As described above, the various processing units are configured by using one or more of the various processors described above as a hardware structure.

More specifically, the hardware structure of the various processors is an electric circuit (circuitry) in which circuit elements such as semiconductor elements are combined.

The configurations and functions described above can be each implemented by any hardware, software, or a combination of both, as appropriate. For example, the present invention is also applicable to a program that causes a computer to execute the processing steps (processing procedure) described above, a computer-readable recording medium (non-transitory recording medium) storing the program, or a computer into which the program is installable.

It goes without saying that while examples of the present invention have been described, the present invention is not limited to the embodiment described above, and various modifications may be made without departing from the gist of the present invention.

REFERENCE SIGNS LIST 10 image analysis apparatus
12 input/output interface
16 storage unit
18 operation unit
20 CPU
22 RAM
24 ROM
26 display control unit
30 display device
32 infrared camera
34 visible camera
36 structure
51 infrared thermal image acquisition unit
53 visible image acquisition unit
55 temperature defect information derivation unit
57 surface defect information derivation unit

59 cause estimation unit
61 information display unit
101 infrared thermal image
102 temperature defect information
103 visible image
104 surface defect information
S1 step
S2 step
S3 step
S4 step
S5 step
S6 step

What is claimed is:

1. An image analysis apparatus comprising a processor configured to:
    acquire an infrared thermal image that is a captured image of a structure to be inspected;
    acquire a visible image that is a captured image of the structure to be inspected;
    determine a temperature defect from the infrared thermal image;
    determine a surface defect, corresponding to the temperature defect, from the visible image;
    determine a temperature defect information, wherein the temperature defect information includes at least a temperature distribution of the temperature defect;
    determine a surface defect information, wherein the surface defect information includes at least a luminance distribution of the surface defect;
    determine a first similarity between the temperature distribution and the luminance distribution for a region corresponding to the entire temperature defect;
    determine a second similarity between the temperature distribution and the luminance distribution for a region corresponding to a portion of the temperature defect;
    determine that the surface defect corresponding to the temperature defect is a crack or peeling; and
    estimate a cause of the temperature defect on the basis of the temperature defect information and the surface defect information, wherein the estimate of the cause of the temperature defect is determined to be bulging accompanied by the crack or peeling when no similarity is found in the first similarity determination but similarity is found in the second similarity determination.

2. The image analysis apparatus according to claim 1, wherein the temperature defect information further includes information on a shape and/or a size of the temperature defect.

3. The image analysis apparatus according to claim 1, wherein the surface defect information further includes information on at least one of a type, a shape, or a position of the surface defect.

4. The image analysis apparatus according to claim 1, wherein
    the processor is configured to:
    in response to estimating that the cause of the temperature defect is the surface defect,
    estimate a temperature distribution caused by the surface defect and reduce the temperature distribution from the infrared thermal image.

5. The image analysis apparatus according to claim 1, wherein
    the processor is configured to:
    evaluate whether the surface defect is present in a size of the temperature defect and/or in the vicinity of a boundary of the temperature defect; and estimate that the cause of the temperature defect is bulging accompanied by the crack or peeling when the surface defect is present.

6. The image analysis apparatus according to claim 1, wherein
    the processor is configured to:
    estimate the cause of the temperature defect on the basis of a temperature gradient at a boundary of the temperature defect.

7. The image analysis apparatus according to claim 1, wherein the surface defect further includes at least one of a repair site, free lime, a joint, or a step.

8. The image analysis apparatus according to claim 1, wherein the visible image is an image obtained by imaging a reflection intensity distribution over two or more different wavelength ranges in a wavelength range of visible light.

9. The image analysis apparatus according to claim 1, further comprising a display device, wherein
    the processor is configured to display an estimation result of the cause of the temperature defect on the display device.

10. An image analysis method comprising:
    a step of acquiring an infrared thermal image that is a captured image of a structure to be inspected;
    a step of acquiring a visible image that is a captured image of the structure to be inspected;
    a step of determining a temperature defect from the infrared thermal image;
    a step of determining a surface defect, corresponding to the temperature defect, from the visible image;
    a step of determining a temperature defect information, wherein the temperature defect information includes at least a temperature distribution of the temperature defect;
    a step of determining a surface defect information, wherein the surface defect information includes at least a luminance distribution of the surface defect;
    a step of determining a first similarity between the temperature distribution and the luminance distribution for a region corresponding to the entire temperature defect;
    a step of determining a second similarity between the temperature distribution and the luminance distribution for a region corresponding to a portion of the temperature defect;
    a step of determining that the surface defect corresponding to the temperature defect is a crack or peeling; and
    a step of estimating a cause of the temperature defect on the basis of the temperature defect information and the surface defect information, wherein the estimate of the cause of the temperature defect is determined to be bulging accompanied by the crack or peeling when no similarity is found in the first similarity determination but similarity is found in the second similarity determination.

11. A non-transitory, computer readable tangible recording medium which records thereon a program for causing, when read by a computer, the computer to execute:
    a step of acquiring an infrared thermal image that is a captured image of a structure to be inspected;
    a step of acquiring a visible image that is a captured image of the structure to be inspected;
    a step of determining a temperature defect from the infrared thermal image;
    a step of determining a surface defect, corresponding to the temperature defect, from the visible image;

a step of determining a temperature defect information, wherein the temperature defect information includes at least a temperature distribution of the temperature defect;

a step of determining a surface defect information, wherein the surface defect information includes at least a luminance distribution of the surface defect;

a step of determining a first similarity between the temperature distribution and the luminance distribution for a region corresponding to the entire temperature defect;

a step of determining a second similarity between the temperature distribution and the luminance distribution for a region corresponding to a portion of the temperature defect;

a step of determining that the surface defect corresponding to the temperature defect is a crack or peeling; and a step of estimating a cause of the temperature defect on the basis of the temperature defect information and the surface defect information, wherein the estimate of the cause of the temperature defect is determined to be bulging accompanied by the crack or peeling when no similarity is found in the first similarity determination but similarity is found in the second similarity determination.

* * * * *